(12) United States Patent
Li et al.

(10) Patent No.: US 12,742,983 B2
(45) Date of Patent: Sep. 22, 2026

(54) REARVIEW MIRROR AND CONTROL METHOD THEREOF, SYSTEM, AND COMPUTER-READABLE STORAGE MEDIUM

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Wenbo Li, Beijing (CN); Huoxing Huang, Beijing (CN); Zhihong Du, Beijing (CN); Yuqiang Zhao, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 838 days.

(21) Appl. No.: 18/015,907

(22) PCT Filed: Feb. 24, 2022

(86) PCT No.: PCT/CN2022/077717

§ 371 (c)(1),
(2) Date: Jan. 12, 2023

(87) PCT Pub. No.: WO2023/159429

PCT Pub. Date: Aug. 31, 2023

(65) Prior Publication Data

US 2024/0248336 A1 Jul. 25, 2024

(51) Int. Cl.

*G02F 1/1333* (2006.01)
*B60R 1/12* (2006.01)

(Continued)

(52) U.S. Cl.

CPC .......... *G02F 1/133308* (2013.01); *B60R 1/12* (2013.01); *G02F 1/13318* (2013.01);

(Continued)

(58) Field of Classification Search

CPC ..... B60R 1/04; B60R 1/12; B60R 2001/1215; B60R 2001/1223; G02F 1/13318; G02F 1/133308

(Continued)

(56) References Cited

U.S. PATENT DOCUMENTS 5,285,060 A 2/1994 Larson et al.
6,870,655 B1 * 3/2005 Northman ......... B60R 21/01566 359/603

(Continued)

FOREIGN PATENT DOCUMENTS

CN 1818745 A 8/2006
CN 101652037 A 2/2010

(Continued)

OTHER PUBLICATIONS

International Search Report and Written Opinion on the International Patent Application No. PCT/CN2022/070090 issued by the International Searching Authority on Aug. 17, 2022.

(Continued)

*Primary Examiner* — Ricky D Shafer
(74) *Attorney, Agent, or Firm* — XSENSUS LLP

(57) ABSTRACT

A rearview mirror includes a display device, at least one switch, a photosensitive sensor, a rear housing and a button. The at least one switch, the photosensitive sensor and the rear housing are disposed on a non-display side of the display device. The photosensitive sensor is configured to sense a light intensity of ambient light located on the non-display side of the display device. An avoidance opening is disposed in the rear housing, and exposes the photo- (Continued)

sensitive sensor and the at least one switch. The button is disposed on a side of the photosensitive sensor and the at least one switch away from the display device, and is connected to the rear housing at the avoidance opening. The button has a light-transmitting region. The button is configured to receive a pressing operation to trigger a respective switch in the at least one switch.

20 Claims, 12 Drawing Sheets

(51) Int. Cl.
*G02F 1/133* (2006.01)
*B60R 1/04* (2006.01)

(52) U.S. Cl.
CPC ......... *B60R 1/04* (2013.01); *B60R 2001/1215* (2013.01); *B60R 2001/1223* (2013.01)

(58) Field of Classification Search
USPC ......................... 359/603, 608, 839, 871, 872
See application file for complete search history.

(56) References Cited

U.S. PATENT DOCUMENTS

| | | | | |
|---|---|---|---|---|
| 10,406,982 | B2* | 9/2019 | Hooper | H01H 13/80 |
| 10,479,277 | B2* | 11/2019 | Kraus | B60R 1/04 |
| 11,014,501 | B2* | 5/2021 | Roth | B60R 1/04 |
| 2004/0032675 | A1* | 2/2004 | Weller | B60R 1/12 359/872 |
| 2005/0099693 | A1* | 5/2005 | Schofield | B60R 1/088 359/604 |
| 2005/0169003 | A1* | 8/2005 | Lindahl | G06F 3/0489 362/494 |
| 2007/0019426 | A1* | 1/2007 | Uken | B60R 1/12 362/494 |
| 2010/0039760 | A1 | 2/2010 | Yang et al. | |
| 2011/0102232 | A1* | 5/2011 | Orr | G01C 21/3658 342/20 |
| 2011/0156893 | A1 | 6/2011 | Hwang et al. | |
| 2015/0036085 | A1 | 2/2015 | Chen et al. | |
| 2015/0277203 | A1 | 10/2015 | VanderPloeg et al. | |
| 2017/0140699 | A1 | 5/2017 | Okohira | |
| 2018/0321546 | A1 | 11/2018 | Sakai et al. | |
| 2019/0095011 | A1* | 3/2019 | Lindahl | G06F 3/0489 |
| 2019/0263322 | A1 | 8/2019 | Hayashi et al. | |
| 2020/0298761 | A1* | 9/2020 | Weindorf | B60R 1/088 |
| 2020/0312275 | A1* | 10/2020 | Ozeki | B60K 35/28 |
| 2020/0384924 | A1 | 12/2020 | Broghammer et al. | |
| 2021/0215961 | A1 | 7/2021 | Gohara et al. | |
| 2021/0300247 | A1* | 9/2021 | Inaba | B60K 35/415 |

FOREIGN PATENT DOCUMENTS

| | | | |
|---|---|---|---|
| CN | 103558708 | B | 3/2016 |
| CN | 106163873 | A | 11/2016 |
| CN | 106573575 | A | 4/2017 |
| CN | 108139636 | A | 6/2018 |
| CN | 207433392 | U | 6/2018 |
| CN | 108462767 | A | 8/2018 |
| CN | 108556743 | A | 9/2018 |
| CN | 207826103 | U | 9/2018 |
| CN | 109689435 | A | 4/2019 |
| CN | 209454642 | U | 10/2019 |
| CN | 209593994 | U | 11/2019 |
| CN | 209683556 | U | 11/2019 |
| CN | 110596934 | A | 12/2019 |
| CN | 210062828 | U | 2/2020 |
| CN | 111464670 | A | 7/2020 |
| CN | 111812876 | A | 10/2020 |
| CN | 212890112 | U | 4/2021 |
| CN | 112874440 | A | 6/2021 |
| CN | 112927627 | A | 6/2021 |
| CN | 113109958 | A | 7/2021 |
| CN | 214523571 | U | 10/2021 |
| CN | 113968185 | A | 1/2022 |
| DE | 202014007830 | U1 | 12/2014 |
| JP | 2006185610 | A | 7/2006 |
| WO | 2021000824 | A1 | 1/2021 |

OTHER PUBLICATIONS

The First Office Action mailed Mar. 13, 2026, in Chinese Application No. 202280000274.3, 26 pages including English translation.

* cited by examiner

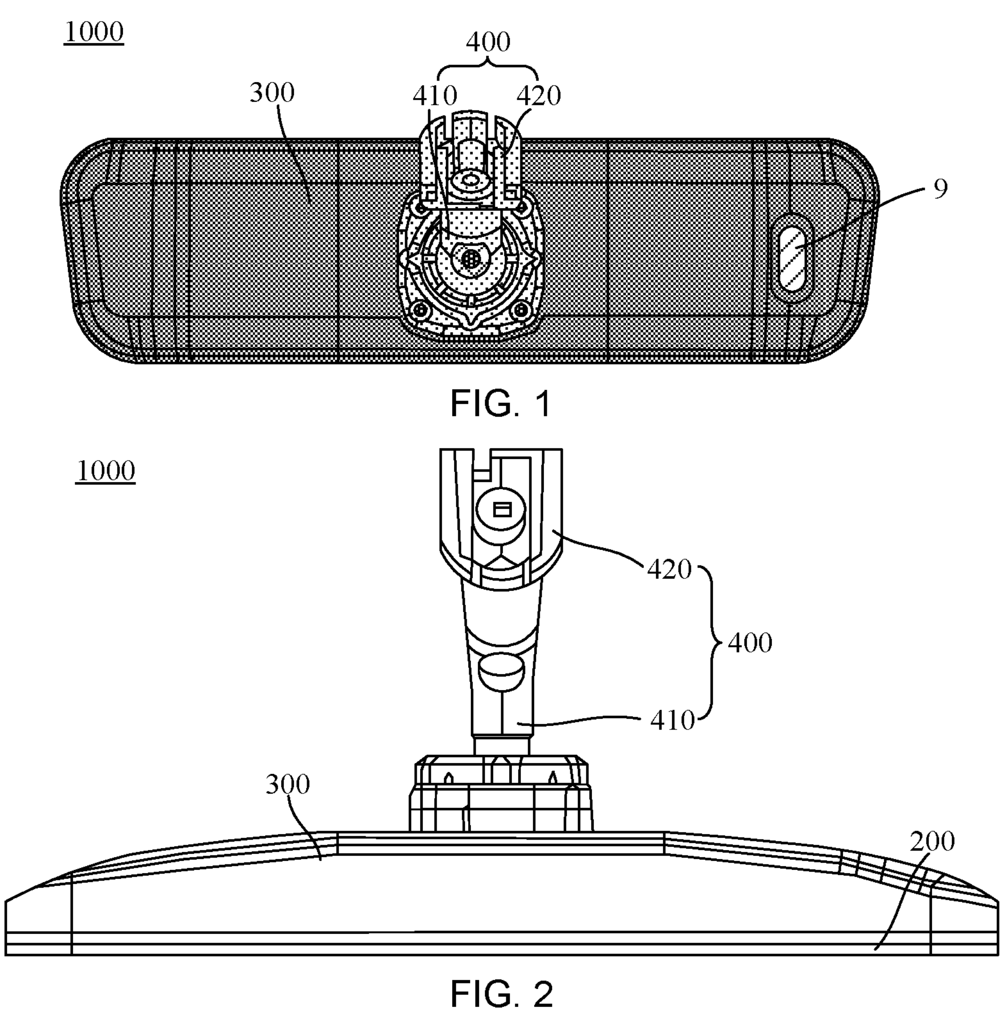
FIG. 1
FIG. 2
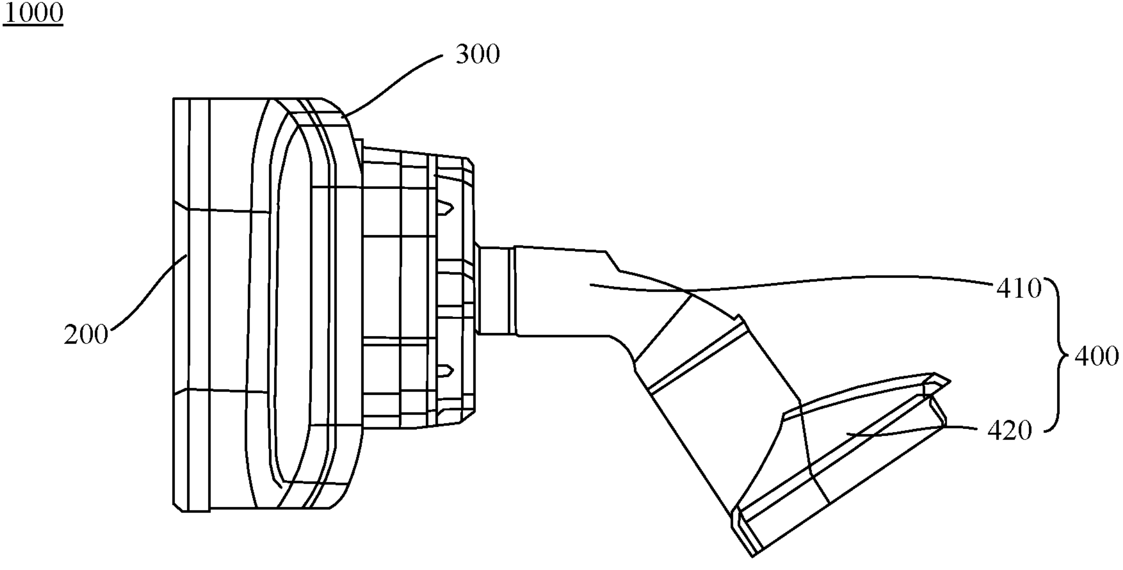
FIG. 3

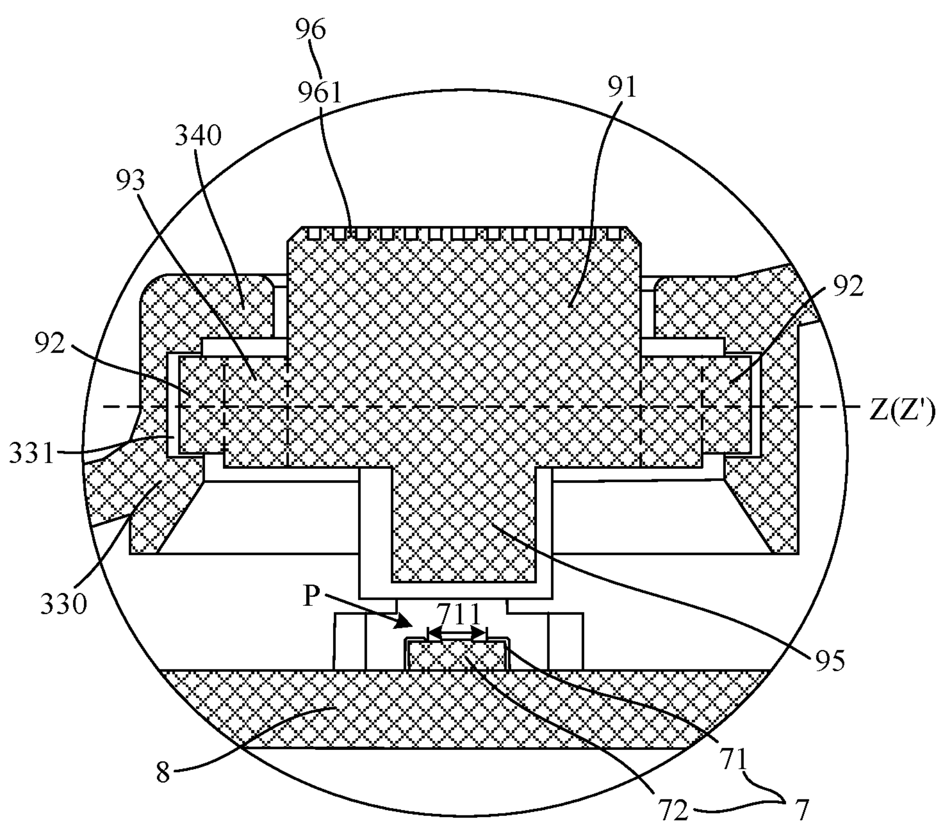
FIG. 18
System setting
Brightness adjustment option
Viewing angle adjustment option
Field of view adjustment option
Exit option
FIG. 19
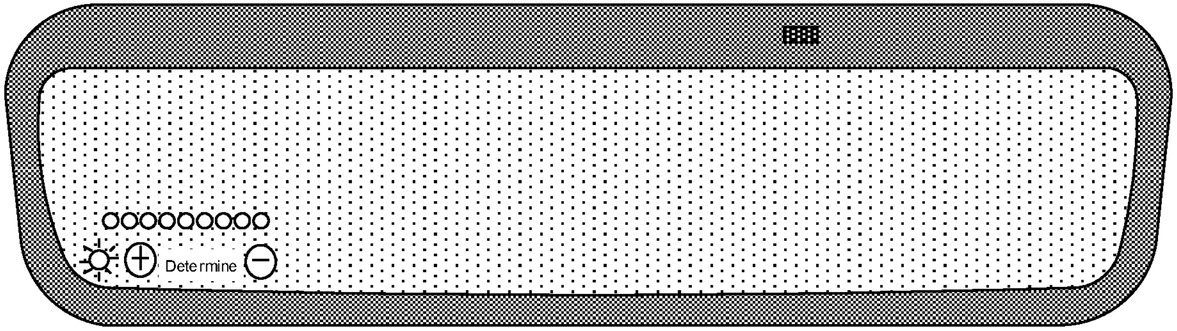
FIG. 20

REARVIEW MIRROR AND CONTROL METHOD THEREOF, SYSTEM, AND COMPUTER-READABLE STORAGE MEDIUM

CROSS-REFERENCE TO RELATED APPLICATION

This application is a national phase entry under 35 USC 371 of International Patent Application No. PCT/CN 2022/077717 filed on Feb. 24, 2022, which is incorporated herein by reference in its entirety.

TECHNICAL FIELD

The present disclosure relates to the field of display technologies, and in particular, to a rearview mirror and a control method thereof, a system, and a computer-readable storage medium.

BACKGROUND

With the development of display technologies, display devices have been widely used in various fields. A display device is applied to a rearview mirror of a vehicle to form a streaming media rearview mirror, which may display a picture behind the vehicle. Compared with a traditional mirror rearview mirror, the streaming media rearview mirror further has a display function. Therefore, the streaming media rearview mirror is gradually becoming popular.

SUMMARY

In an aspect, a rearview mirror is provided. The rearview mirror includes a display device, at least one switch, a photosensitive sensor, a rear housing and a button. The at least one switch is disposed on a non-display side of the display device. The photosensitive sensor is disposed on the non-display side of the display device. The photosensitive sensor is configured to sense a light intensity of ambient light located on the non-display side of the display device. The rear housing is disposed on the non-display side of the display device. An avoidance opening is disposed in the rear housing, and exposes the photosensitive sensor and the at least one switch. The button is disposed on a side of the photosensitive sensor and the at least one switch away from the display device, and is connected to the rear housing at the avoidance opening. The button has a light-transmitting region that is a region covered by an orthographic projection of the photosensitive sensor on a surface of the button away from the display device. The button is configured to receive a pressing operation to trigger a respective switch in the at least one switch.

In some embodiments, the at least one switch includes two switches. The two switches and the photosensitive sensor are arranged in a first direction, and the photosensitive sensor is located between the two switches. The button includes a pressing portion including a first pressing sub-portion and a second pressing sub-portion. The first pressing sub-portion is configured to receive the pressing operation to trigger one of the two switches. The second pressing sub-portion is configured to receive the pressing operation to trigger another one of the two switches.

In some embodiments, the rear housing includes a fixing portion arranged around the avoidance opening. Two mounting shaft holes are disposed in the fixing portion. Axes of the two mounting shaft holes are perpendicular to the first direction, and are parallel to a reference plane. The reference plane is a plane where a surface of the display device located on a display side of the display device is located. The button further includes two rotation shafts respectively located on two opposite sides of the pressing portion. A straight line where an axis of each rotation shaft is located passes between the first pressing sub-portion and the second pressing sub-portion. Each rotation shaft is correspondingly located in a mounting shaft hole in the two mounting shaft holes.

In some embodiments, the pressing portion is spaced apart from the fixing portion. The rear housing further includes a shielding portion arranged around the button and connected to an end portion of the fixing portion away from the display device. The button further includes a blocking flange arranged around the pressing portion and located on a side of the shielding portion proximate to the display device.

In some embodiments, the pressing portion is spaced apart from the switches. The button further includes two pressing pillars disposed on a side of the pressing portion proximate to the display device and connected to the two switches in one-to-one correspondence.

In some embodiments, the pressing portion is spaced apart from the switches. The button further includes a light guide pillar disposed on a side of the pressing portion proximate to the display device. The light guide pillar includes a light incident surface and a light exit surface. The light incident surface is a surface of the light guide pillar proximate to the pressing portion, and is located in the light-transmitting region of the button. The light exit surface is a surface of the light guide pillar away from the pressing portion. The light guide pillar is configured such that light entering from the light incident surface is totally reflected in the light guide pillar, and exits from the light exit surface to the photosensitive sensor.

In some embodiments, the photosensitive sensor includes a base and a photosensitive chip disposed in the base, and a light-transmitting hole is disposed in a portion of the base located on a photosensitive side of the photosensitive chip. The photosensitive chip is configured to sense the light intensity of the ambient light located on the non-display side of the display device through the light-transmitting hole. An orthographic projection of the light guide pillar on a reference plane is at least partially overlapped with an orthogonal projection of the light-transmitting hole on the reference plane. The reference plane is a plane where a surface of the display device located on a display side of the display device is located.

In some embodiments, the button further includes a light gathering structure disposed on a side of the pressing portion away from the display device. The light gathering structure includes a plurality of protrusions spaced apart from each other, and each protrusion extends along a circumferential direction of the pressing portion. The light gathering structure is configured to gather ambient light incident on a surface of the pressing portion away from the display device to a target region. The target region is located within the light-transmitting region or coincides with the light-transmitting region.

In some embodiments, the plurality of protrusions include annular protrusions, and first arc-shaped protrusions and second arc-shaped protrusions that are located respectively on two opposite sides of the annular protrusions. The annular protrusions each surround a center of the target region, the first arc-shaped protrusions are located at the first pressing sub-portion, and the second arc-shaped protrusions are located at the second pressing sub-portion. A center of a circle, on which a first arc-shaped protrusion in the first arc-shaped protrusions is located, is located on a side of the first arc-shaped protrusion proximate to the center of the target region. A center of a circle, on which a second arc-shaped protrusion in the second arc-shaped protrusions is located, is located on a side of the second arc-shaped protrusion proximate to the center of the target region.

In some embodiments, the button is of an integral structure, and is transparent.

In some embodiments, the rearview mirror further includes at least one elastic cushion each disposed between a switch in the at least one switch and the button.

In some embodiments, the display device includes a display panel, a mirror element and a driving board. The mirror element is stacked on the display panel, and is disposed on a light exit side of the display panel. The mirror element is configured to reflect at least part of ambient light incident on the rearview mirror. The driving board is electrically connected to the display panel and the mirror element. The driving board is disposed on a side of the display panel away from the mirror element. The at least one switch is disposed on a surface of the driving board away from the mirror element.

In another aspect, a control method of a rearview mirror is provided. The rearview mirror is the rearview mirror in any one of the above embodiments. The control method includes: in a display mode, controlling the rearview mirror to switch to a mirror mode in response to a first trigger operation of the button; and in the mirror mode, controlling the rearview mirror to switch to the display mode in response to the first trigger operation of the button.

In some embodiments, the control method further includes: in the display mode, controlling the rearview mirror to display a system setting interface in response to a second trigger operation of the button, the system setting interface including an exit option and at least one function option, the exit option being configured to exit the system setting interface in response to the first trigger operation, each function option corresponding to a preset function setting interface, the function option being configured to call out the preset function setting interface corresponding to the function option in response to the first trigger operation, and the preset function setting interface including a plurality of adjustment parameters of a preset function; in the system setting interface, determining the exit option or one of the at least one function option as a target option in response to a third trigger operation of the button; and based on the target option, exiting the system setting interface or calling out the preset function setting interface in response to the first trigger operation.

In some embodiments, the control method further includes: in the preset function setting interface, determining one of the plurality of adjustment parameters of the preset function as a target parameter in response to the third trigger operation of the button; and updating a current parameter of the preset function of the rearview mirror to the target parameter in response to the first trigger operation of the button.

In some embodiments, the at least one function option includes at least one of a brightness adjustment option, a viewing angle adjustment option and a field of view adjustment option. The brightness adjustment option is configured to call out a brightness setting interface in response to the first trigger operation. The brightness setting interface includes a plurality of adjustment parameters of brightness. The viewing angle adjustment option is configured to call out a viewing angle setting interface in response to the first trigger operation. The viewing angle setting interface includes a plurality of adjustment parameters of viewing angle. The field of view adjustment option is configured to call out a field of view setting interface in response to the first trigger operation. The field of view setting interface includes a plurality of adjustment parameters of field of view.

In some embodiments, the control method further includes: in the display mode, controlling the rearview mirror to adjust an viewing angle in response to a third trigger operation of the button; and/or when a display failure occurs, controlling the rearview mirror to switch to the mirror mode in response to the first trigger operation of the button.

In some embodiments, the button includes a pressing portion, and the pressing portion includes a first pressing sub-portion and a second pressing sub-portion. The first trigger operation is to press the first pressing sub-portion, and a pressing duration is less than or equal to a fourth preset duration. Alternatively, the first trigger operation is to press the first pressing sub-portion, and the pressing duration is less than or equal to the fourth preset duration; the second trigger operation is to press the first pressing sub-portion or the second pressing sub-portion, and a pressing duration is greater than or equal to a first preset duration and less than or equal to a second preset duration; the third trigger operation is to press the second pressing sub-portion, and a pressing duration is less than or equal to a third preset duration.

In yet another aspect, a rearview mirror system is provided. The rearview mirror system includes the rearview mirror in any one of the above embodiments and a control device. The control device includes a processor and a memory storing computer program instructions. When run on the processor, the computer program instructions cause the processor to execute the control method of the rearview mirror in any one of the above embodiments.

In yet another aspect, a non-transitory computer-readable storage medium storing computer program instructions is provided. When run on a computer, the computer program instructions cause the computer to execute the control method of the rearview mirror in any one of the above embodiments.

In yet another aspect, a computer program is provided. When executed on a computer (e.g., the rearview mirror), the computer program causes the computer to execute the control method of the rearview mirror in any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and an actual timing of a signal involved in the embodiments of the present disclosure.

FIG. 1 is a rear view of a rearview mirror, in accordance with some embodiments;

FIG. 2 is a top view of a rearview mirror, in accordance with some embodiments;

FIG. 3 is a side view of a rearview mirror, in accordance with some embodiments;

FIG. 18 is a sectional view taken along the C-C' section line in FIG. 9;

FIG. 19 is a diagram showing a system setting interface of a rearview mirror, in accordance with some embodiments;

FIG. 20 is a diagram showing a brightness setting interface of a rearview mirror, in accordance with some embodiments;

DETAILED DESCRIPTION

Figure 4:
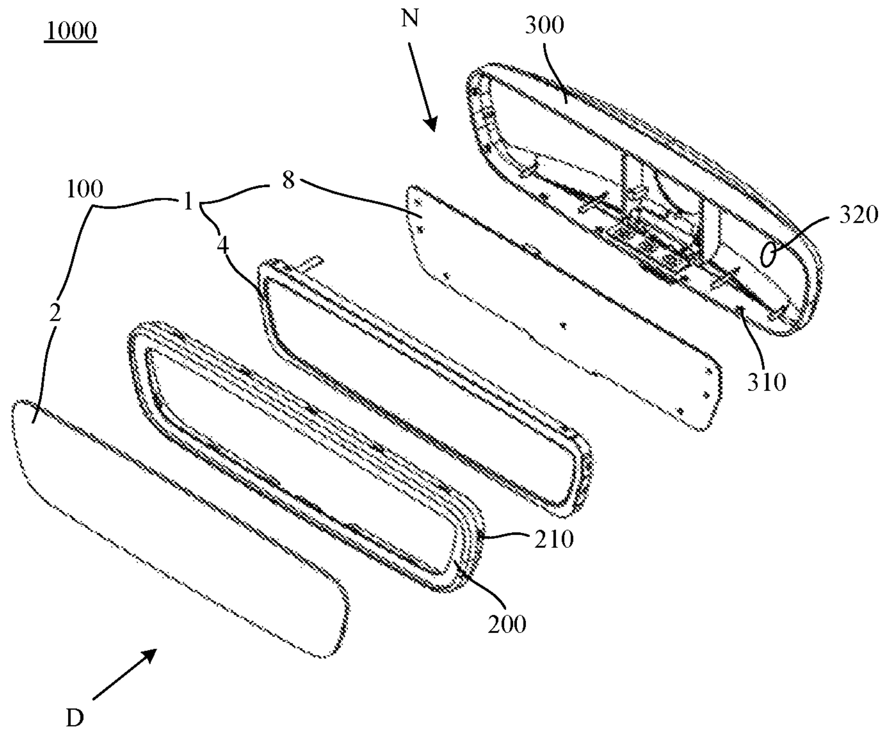
FIG. 4 is an exploded view of a rearview mirror, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term “comprise” and other forms thereof such as the third-person singular form “comprises” and the present participle form “comprising” are construed as an open and inclusive meaning, i.e., “including, but not limited to.” In the description of the specification, the terms such as “one embodiment,” “some embodiments,” “exemplary embodiments,” “an example,” “specific example” or “some examples” are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as “first” and “second” are only used for descriptive purposes, and are not to be construed as indicating or implying relative importance or implicitly indicating the number of indicated technical features. Thus, a feature defined with “first” or “second” may explicitly or implicitly include one or more of the features. In the description of the embodiments of the present disclosure, the term “a plurality of/the plurality of” means two or more unless otherwise specified.

In the description of some embodiments, the term “coupled” and “connected” and derivatives thereof may be used. For example, the term “connected” may be used in the description of some embodiments to indicate that two or more components are in direct physical or electrical contact with each other. For another example, the term “coupled” may be used in the description of some embodiments to indicate that two or more components are in direct physical or electrical contact. However, the term “coupled” or “communicatively coupled” may also mean that two or more components are not in direct contact with each other, but still cooperate or interact with each other. The embodiments disclosed herein are not necessarily limited to the contents herein.

The phrase “at least one of A, B and C” has the same meaning as the phrase “at least one of A, B or C”, both including following combinations of A, B and C: only A, only B, only C, a combination of A and B, a combination of A and C, a combination of B and C, and a combination of A, B and C.

The phrase “A and/or B” includes following three combinations: only A, only B, and a combination of A and B.

The use of the phase “applicable to” or “configured to” herein means an open and inclusive expression, which does not exclude devices that are applicable to or configured to perform additional tasks or steps.

In addition, the use of the phase “based on” means openness and inclusiveness, since a process, step, calculation or other action that is “based on” one or more stated conditions or values may, in practice, be based on additional conditions or values exceeding those stated.

Exemplary embodiments are described herein with reference to sectional views and/or plan views as idealized exemplary drawings. In the accompanying drawings, thicknesses of layers and sizes of regions are enlarged for clarity. Thus, variations in shape relative to the accompanying drawings due to, for example, manufacturing techniques and/or tolerances may be envisaged. Therefore, the exemplary embodiments should not be construed to be limited to the shapes of regions shown herein, but to include deviations in shape due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

FIG. 1 is a rear view of a rearview mirror, in accordance with some embodiments. FIG. 2 is a top view of a rearview mirror, in accordance with some embodiments. FIG. 3 is a side view of a rearview mirror, in accordance with some embodiments. FIG. 4 is an exploded view of a rearview mirror, in accordance with some embodiments. As shown in FIG. 4, the rearview mirror 1000 includes a display device 100, a front frame 200 and a rear housing 300. The display device 100 has a display side D and a non-display side N opposite to the display side D. The front frame 200 is arranged around the display device 100, and the rear housing 300 is disposed on the non-display side N of the display device 100. The front frame 200 is connected to the rear housing 300 to fix the display device 100 and protect an edge of the display device 100.

Here, the connection between the front frame 200 and the rear housing 300 is not unique, and may be a clamping connection, or a screw connection, or of course, other connection. For example, the rear housing 300 is provided with a plurality of clamping hooks 310. The plurality of clamping hooks 310 are distributed along a circumferential direction of the rear housing 300, and are located on a side of the rear housing 300 proximate to the front frame 200. The front frame 200 is provided with a plurality of clamping holes 210. The plurality of clamping hooks 310 and the plurality of clamping holes 210 are clamped in one-to-one correspondence to form an accommodating cavity, so that the display device 100 is fixed in the accommodating cavity formed by the connection between the front frame 200 and the rear housing 300.

In some embodiments, as shown in FIGS. 1, 2 and 3, the rearview mirror 1000 further includes a bracket assembly 400. An end of the bracket assembly 400 is connected to the rear housing 300, and another end of the bracket assembly 400 is configured to be connected to a front windshield inside a vehicle.

For example, the bracket assembly 400 includes a bracket 410, a claw disc 420 and a clamping piece (not shown in FIGS. 1, 2 and 3) that are connected in sequence. An end of the bracket 410 is connected to the rear housing 300, and is rotatable relative to the rear housing 300, and another end of the bracket 410 is connected to the claw disc 420. The claw disc 420 is connected to the clamping piece, and is rotatable relative to the clamping piece. The clamping piece is fixed to the front windshield inside the vehicle, so that the rearview mirror 1000 is fixed to the front windshield inside the vehicle, and an angle of the rearview mirror 1000 may be adjusted.

Referring to FIG. 4, the display device 100 may be a liquid crystal display (LCD) device, or may be an electroluminescent display device or a photoluminescent display device. In a case where the display device is the electroluminescent display device, the electroluminescent display device may be an organic light-emitting diode (OLED) display device or a quantum dot light-emitting diode (QLED) display device. In a case where the display device is the photoluminescent display device, the photoluminescent display device may be a quantum dot photoluminescent display device.

Figure 5:
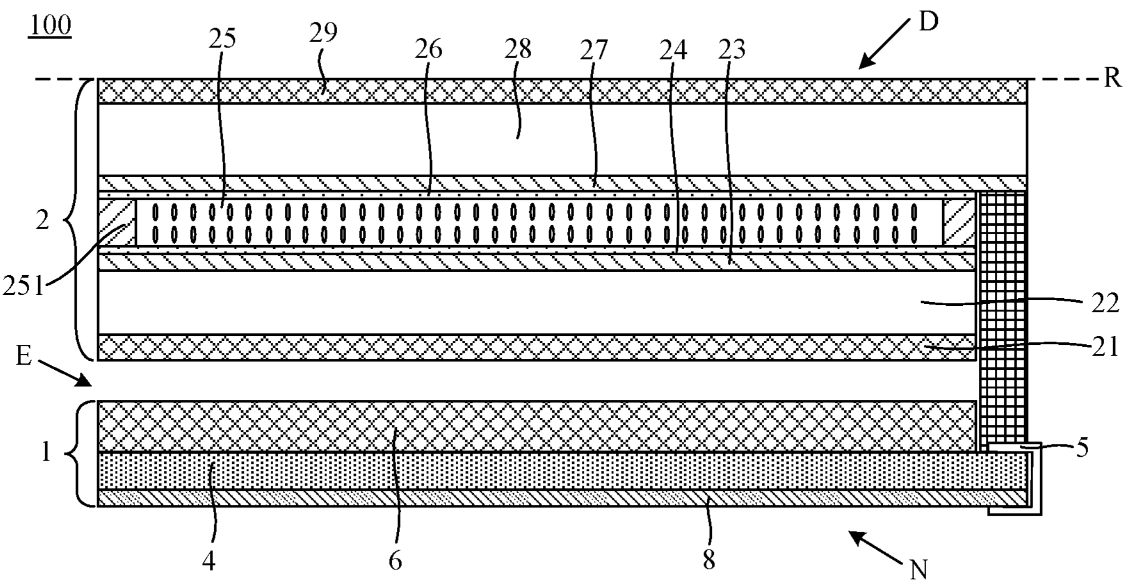
FIG. 5 is a sectional view of a display device, in accordance with some embodiments.
Figure 6:
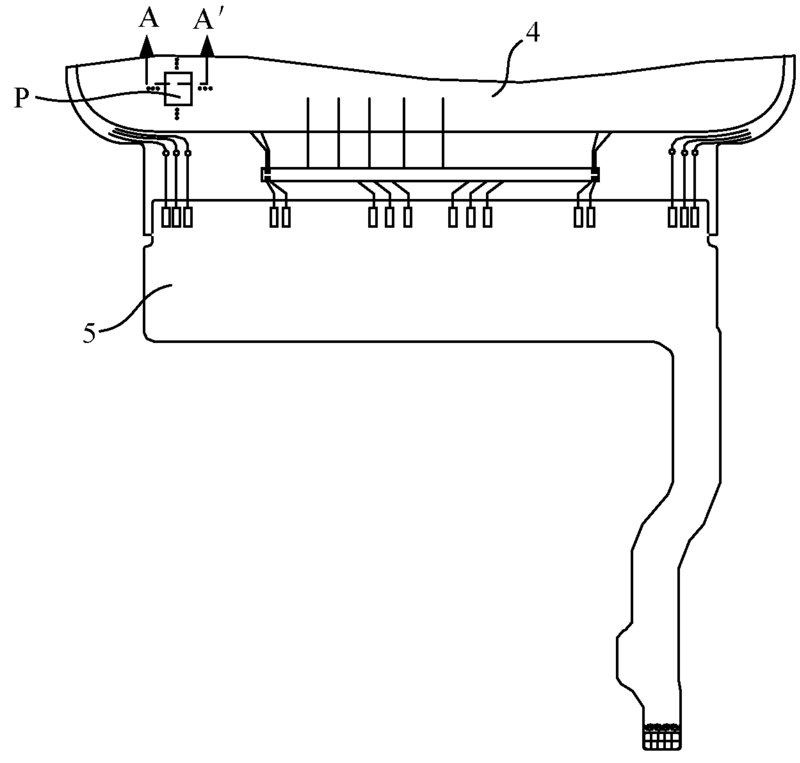
FIG. 6 is a structural diagram showing a connection between a display panel and a flexible printed circuit of a display device, in accordance with some embodiments.
Figure 7:
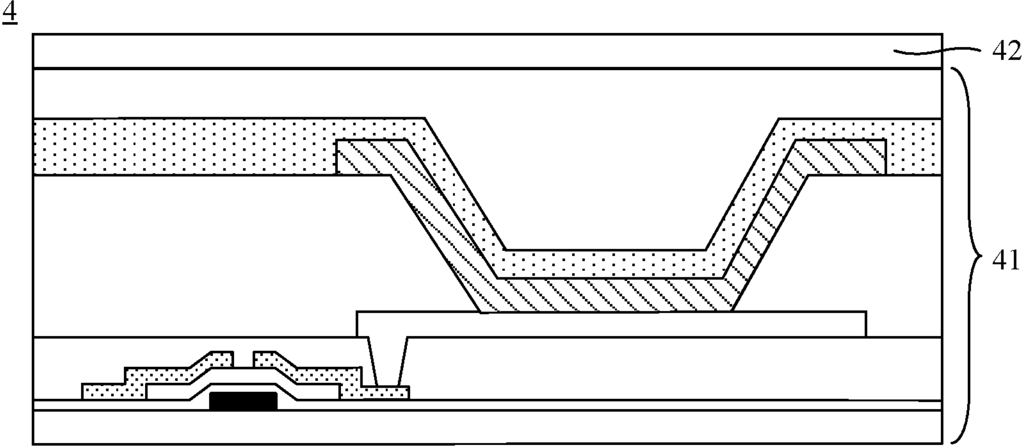
FIG. 7 is a sectional view taken along the A-A' section line in FIG. 6.
Figure 8:
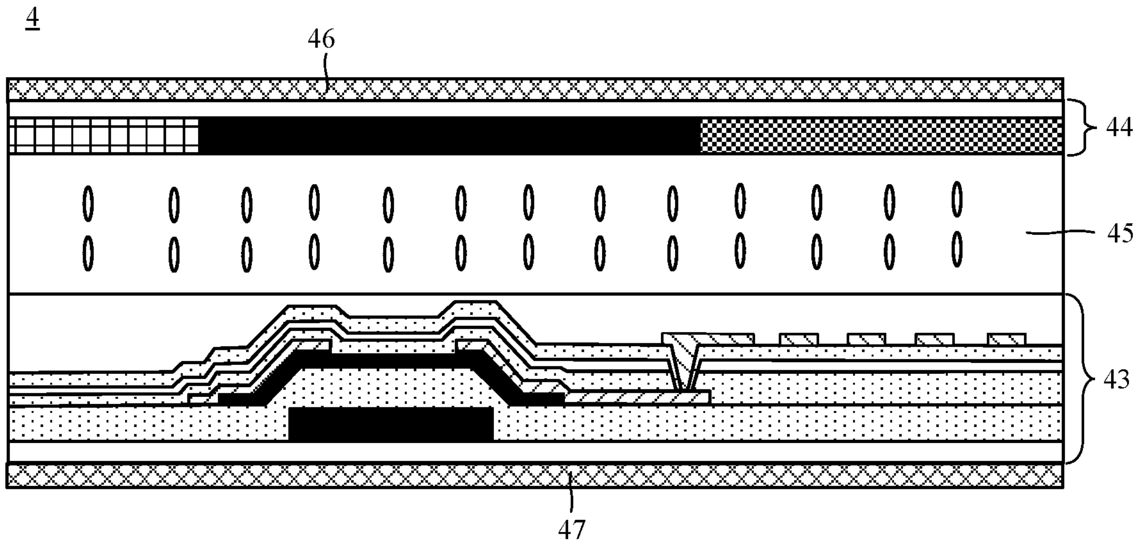
FIG. 8 is another sectional view taken along the A-A' section line in FIG. 6.

FIG. 5 is a sectional view of a display device, in accordance with some embodiments. FIG. 6 is a structural diagram showing a connection between a display panel and a flexible printed circuit of a display device, in accordance with some embodiments. FIG. 7 is a sectional view taken along the A-A' section line in FIG. 6. FIG. 8 is another sectional view taken along the A-A' section line in FIG. 6.

As shown in FIGS. 4 and 5, the display device 100 includes a display module 1 and a mirror element 2 located on a light exit side of the display module 1. The mirror element 2 is configured to reflect at least part of ambient light incident on the rearview mirror 1000.

The mirror element 2 may be a liquid crystal screen, an electrochromic device, or a transflective film. Below, as an example, the mirror element 2 is the liquid crystal screen.

For example, the mirror element 2 is the liquid crystal screen, and is configured to be switchable between a high transmission state and a high reflection state. When the mirror element 2 is in the high transmission state, the mirror element 2 may transmit a display image of the display module 1 to realize a display function. When the mirror element 2 is in the high reflection state, the mirror element 2 reflects external light to display a mirror image.

It will be noted that in order to avoid double images caused by an interference between the display image of the display module 1 and the mirror image displayed on the mirror element 2, when the display module 1 displays an image, the mirror element 2 is in the high transmission state, and has a transmittance of greater than or equal to 90%; when the display module 1 does not display an image, the mirror element 2 is in the high reflection state, and has a reflectivity of greater than or equal to 40%.

In some embodiments, as shown in FIGS. 5 and 6, the display module 1 includes a display panel 4, a flexible printed circuit 5 and other electronic accessories. The mirror element 2 is stacked on the display panel 4, and is disposed on a light exit side E of the display panel 4. In a case where the display device 100 is the liquid crystal display device, the display device 100 further includes a backlight assembly. The backlight assembly is configured to provide light required for displaying an image to the display panel 4.

An orthographic projection of the display panel 4 on a reference plane R is located within an orthographic projection of the mirror element 2 on the reference plane R. It will be noted that the reference plane R is a plane where a surface of the mirror element 2 away from the display panel 4 is located.

In the case where the display device 100 is the electroluminescent display device or the photoluminescent display device, as shown in FIG. 7, the display panel 4 is an electroluminescent display panel. The electroluminescent display panel includes a display substrate 41 and an encapsulation layer 42 for encapsulating the display substrate 41.

In the case where the display device 100 is the liquid crystal display device, as shown in FIG. 8, the display panel 4 is a liquid crystal display panel. The liquid crystal display panel includes an array substrate 43 and an opposite substrate 44 arranged opposite to each other, a liquid crystal box 45 disposed between the array substrate 43 and the opposite substrate 44, an upper polarizer 46 disposed on a side of the opposite substrate 44 away from the liquid crystal box 45, and a lower polarizer 47 disposed on a side of the array substrate 43 away from the liquid crystal box 45.

In some embodiments, as shown in FIG. 5, in a direction from the display panel 4 to the mirror element 2, the mirror element 2 includes a reflective polarizer 21, a first transparent substrate 22, a first transparent electrode layer 23, a first alignment film 24, a liquid crystal layer 25, a second alignment film 26, a second transparent electrode layer 27, a second transparent substrate 28 and a first absorptive polarizer 29 that are arranged in sequence.

It will be noted that the liquid crystal layer 25 includes a frame sealant 251 and liquid crystal molecules located between the frame sealant 251, the first alignment film 24 and the second alignment film 26, and details will not be described.

In some embodiments, a transmission axis of the reflective polarizer 21 is substantially perpendicular to an absorption axis of the first absorptive polarizer 29. An orientation direction of the first alignment film 24 is substantially parallel to the transmission axis of the reflective polarizer 21. An orientation direction of the second alignment film 26 is substantially parallel to the absorption axis of the first absorptive polarizer 29. That is, a long axis direction of a liquid crystal molecule in the liquid crystal layer 25 close to the first alignment film 24 is substantially parallel to the transmission axis of the reflective polarizer 21. A long axis direction of a liquid crystal molecule in the liquid crystal layer 25 close to the second alignment film 26 is substantially parallel to the absorption axis of the first absorptive polarizer 29. The liquid crystal molecules are arranged in layers, liquid crystal molecules in a layer have the same orientation, and liquid crystal molecules in layers have different orientations, so that an overall molecular structure has a spiral shape.

It can be understood that non-polarized light located on a side of the mirror element 2 away from the display panel 4 and non-polarized light emitted from the display panel 4 each may be decomposed into first polarized light and second polarized light whose polarization directions are perpendicular to each other. Here, the polarization direction of the first polarized light is substantially parallel to the absorption axis of the first absorptive polarizer 29, i.e., is substantially perpendicular to the transmission axis of the reflective polarizer 21. The polarization direction of the second polarized light is substantially perpendicular to the absorption axis of the first absorptive polarizer 29, i.e., is substantially parallel to the transmission axis of the reflective polarizer 21.

When the display device 100 is in a mirror mode, the display panel 4 does not emit light, and ambient light located on the side of the mirror element 2 away from the display panel 4 is reflected by the mirror element 2.

For example, the orientation direction of the first alignment film 24 is substantially perpendicular to the orientation direction of the second alignment film 26, and the first transparent electrode layer 23 and the second transparent electrode layer 27 have no electric field therebetween. In this case, the ambient light (i.e., non-polarized light) located on the side of the mirror element 2 away from the display panel 4 travels to the first absorptive polarizer 29. The first polarized light of the non-polarized light is absorbed by the first absorptive polarizer 29, and the second polarized light of the non-polarized light enters the liquid crystal layer 25 through the first absorptive polarizer 29 and the second alignment film 26. After the second polarized light passes through the liquid crystal layer 25, the polarization direction of the second polarized light is deflected by 90° and converted into first polarized light, and a polarization direction of the first polarized light is substantially perpendicular to the transmission axis of the reflective polarizer 21. The first polarized light is reflected back to the liquid crystal layer 25 by the reflective polarizer 21 through the first alignment film 24, and after passing through the liquid crystal layer 25 again, the polarization direction of the first polarized light is deflected by 90° and converted into the second polarized light. The second polarized light travels to the outside through the second alignment film 26 and the first absorptive polarizer 29. In this case, if the layers are each made of an ideal dielectric material, an attenuation of light tends to be zero, and the mirror element 2 has a highest reflectivity that is greater than or equal to 40%, so that the mirror element 2 is in a mirror state with the highest reflectivity.

When the display device 100 is in a display mode, the display panel 4 emits light, and the light emitted from the display panel 4 may travel to the outside through the mirror element 2.

For example, the first transparent electrode layer 23 and the second transparent electrode layer 27 have a strong electric field therebetween, and the liquid crystal molecules are aligned along an electric field direction. For example, in a case where the liquid crystal molecules overcome anchoring forces of the first alignment film 24 and the second alignment film 26 to be arranged substantially vertically (i.e., the long axis direction of the liquid crystal molecules is substantially parallel to a thickness direction of the mirror element 2), optical activities of the liquid crystal molecules disappear. That is, the liquid crystal layer 25 has no effect on modulation of polarized light, and the polarized light still passes through in an original direction. In this case, the non-polarized light emitted from the display panel 4 travels to the reflective polarizer 21. The first polarized light of the non-polarized light is reflected by the reflective polarizer 21, and the second polarized light of the non-polarized light enters the liquid crystal layer 25 through the reflective polarizer 21 and the first alignment film 24. After the second polarized light passes through the liquid crystal layer 25, the polarization direction of the second polarized light is unchanged, and the second polarized light travels to the outside through the second alignment film 26 and the first absorptive polarizer 29. In this case, if the layers are each made of an ideal dielectric material, attenuation of light tends to be zero, and the mirror element 2 has a highest transmittance that is greater than or equal to 90%, so that the mirror element 2 is in a transparent state with the highest transmittance.

It can be seen from the above that the transmission axis of the reflective polarizer 21 is substantially perpendicular to the absorption axis of the first absorptive polarizer 29, the orientation direction of the first alignment film 24 is substantially parallel to the transmission axis of the reflective polarizer 21, and the orientation direction of the second alignment film 26 is substantially parallel to the absorption axis of the first absorptive polarizer 29. In this way, in a natural state, the mirror element 2 is in the mirror state with the highest reflectivity, and the display device 100 may clearly display a mirror image of an external environment; when an image is displayed, the mirror element 2 is in the transparent state with the highest transmittance, and the display device 100 may clearly display a display image with a low power consumption.

In order to avoid an interference between the external ambient light reflected by the display panel 4 and the light emitted from the display panel 4 for displaying an image, in some embodiments, as shown in FIG. 5, the display device 100 further includes a second absorptive polarizer 6 disposed between the display panel 4 and the mirror element 2. An absorption axis of the second absorptive polarizer 6 is substantially perpendicular to the transmission axis of the reflective polarizer 21.

In this case, when the display device 100 is in the display mode, the first polarized light of the non-polarized light emitted from the display panel 4 is absorbed by the second absorptive polarizer 6, and the second polarized light of the non-polarized light travels to the outside sequentially through the second absorptive polarizer 6, the reflective polarizer 21, the first alignment film 24, the liquid crystal layer 25, the second alignment film 26 and the first absorptive polarizer 29, so that the display effect is prevented from being affected due to the interference on the display image caused by a re-reflection, and the re-reflection means that the first polarized light of the non-polarized light emitted from the display panel 4 is reflected by the reflective polarizer 21 onto the display panel 4.

It will be noted that in a case where the display panel 4 is the liquid crystal display panel, the upper polarizer 46 in FIG. 8 is the same as the second absorptive polarizer 6 in FIG. 5. In a case where the display panel 4 is the electroluminescent display panel, the second absorptive polarizer 6 may be a circular polarizer located on a light exit side of the electroluminescent display panel.

In order to prevent the ambient light reflected by the rearview mirror 1000 from being too bright to affect a user's driving, referring to FIG. 10, the rearview mirror 1000 further includes a photosensitive sensor (referred to as first photosensitive sensor below) 7 and a second photosensitive sensor (not shown in FIGS. 4 and 10). The first photosensitive sensor 7 is configured to sense a light intensity of ambient light located on the non-display side N of the display device 100. The second photosensitive sensor is configured to sense a light intensity of the ambient light located on the display side D of the display device 100.

As shown in FIGS. 4 and 5, the display module 1 further includes a driving board 8 electrically connected to the display panel 4. The driving board 8 is configured to drive the display panel 4 to display. The driving board 8 is further electrically connected to the mirror element 2, and is further configured to control the transmittance or reflectivity of the mirror element 2.

Circuit wirings, electronic components (such as capacitors, resistors and triodes) and chips (such as a driver chip, a timing control chip and a power management chip) are provided on the driving board 8. Moreover, the driving board 8 may be bent to a side of the display panel 4 away from the mirror element 2 through the flexible printed circuit 5. The first photosensitive sensor 7 may be disposed on a surface of the driving board 8 away from the display panel 4.

In addition, the driving board 8 is further electrically connected to the first photosensitive sensor 7 and the second photosensitive sensor. The driving board 8 is further configured to send a corresponding control signal to the mirror element 2 in a case where a difference between the light intensity sensed by the second photosensitive sensor and the light intensity sensed by the first photosensitive sensor 7 is greater than or equal to a first preset light intensity, so as to reduce the reflectivity of the mirror element 2, thereby achieving a purpose of anti-glare.

It will be noted that the first preset light intensity may be set according to an actual situation, which is not specifically limited.

In addition, the driving board 8 may further perform a plurality of determinations with respect to the light intensity sensed by the second photosensitive sensor and a plurality of preset light intensities. A process of each determination is to determine whether the light intensity sensed by the second photosensitive sensor is greater than or equal to a corresponding preset light intensity, and send a corresponding control signal in a case where the light intensity sensed by the second photosensitive sensor is greater than or equal to the corresponding preset light intensity, so as to reduce the reflectivity of the mirror element 2 to a corresponding range.

Figure 10:
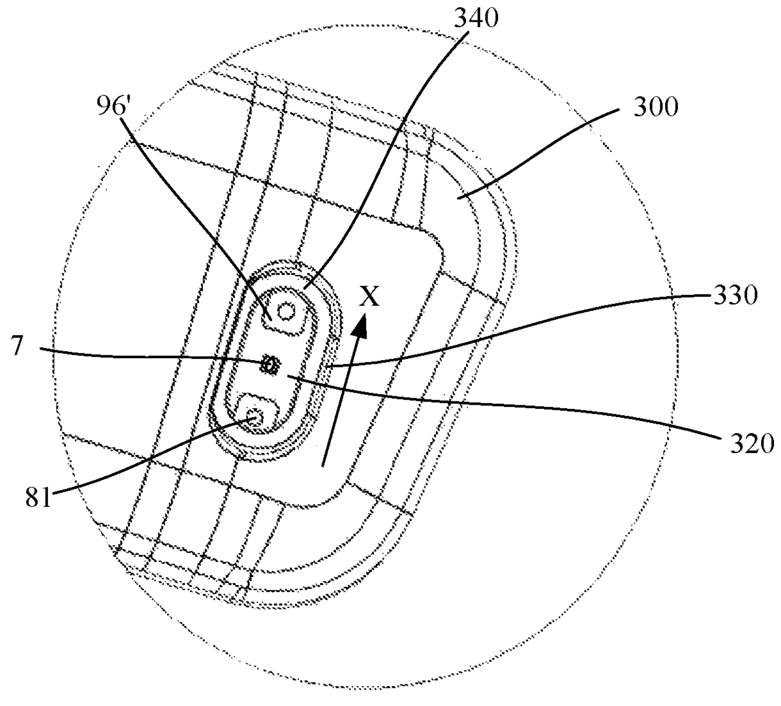
FIG. 10 is a partial enlarged view of a rearview mirror at an avoidance opening, in accordance with some embodiments.

It can be understood that in order to enable a user to manually control the display or non-display of the rearview mirror 1000, referring to FIG. 10, the rearview mirror 1000 further includes switch(es) 81 for controlling the display device 100 to be turned on or off, so that the user manually triggers the switch 81 by pressing a button to control the display device 100 to be turned on or off.

In the related art, switch(es) and corresponding button(s) are disposed on a front frame, i.e., are located on a display side of a display device, which results in an increase in a size of a bezel of the front frame located at the display side of the display device. That is, a space occupied by the streaming media rearview mirror is large, and a screen-to-body ratio is low. In addition, the button(s) and other devices (e.g., photosensitive sensor(s)) are not arranged in a centralized way, which results in complex circuit wirings inside the streaming media rearview mirror and high manufacturing costs.

Based on this, as shown in FIGS. 4 and 10, some embodiments of the present disclosure provide the rearview mirror 1000. The switch(es) 81 are disposed on the surface of the driving board 8 away from the mirror element 2. An avoidance opening 320 is provided in the rear housing 300, and exposes the first photosensitive sensor 7 and the switch (es) 81.

In this way, circuit wirings connected to the switch(es) 81 and circuit wirings connected to the first photosensitive sensor 7 on the driving board 8 may be centrally arranged, thereby improving an arrangement regularity of the circuit wirings, so as to save a space for the circuit layout and reduce costs.

Figure 9:
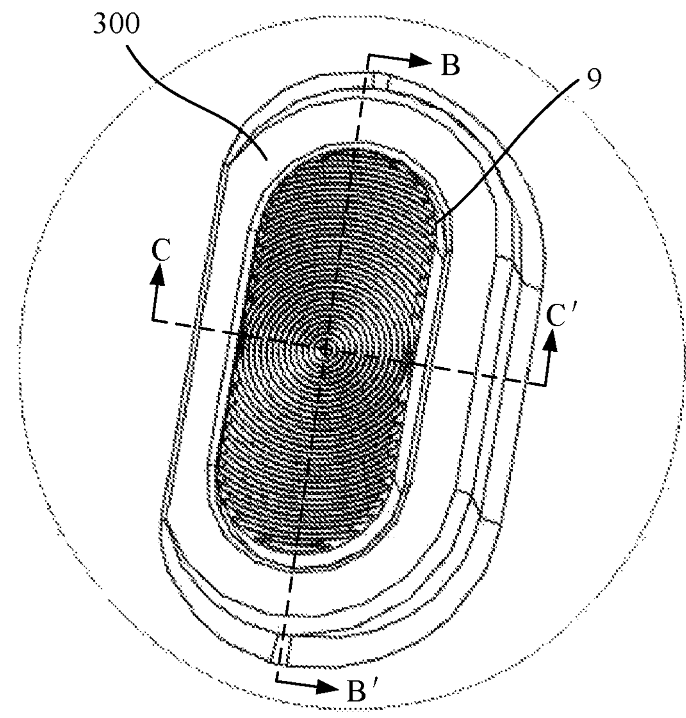
FIG. 9 is a partial enlarged view of a rearview mirror at a button, in accordance with some embodiments.
Figure 17:
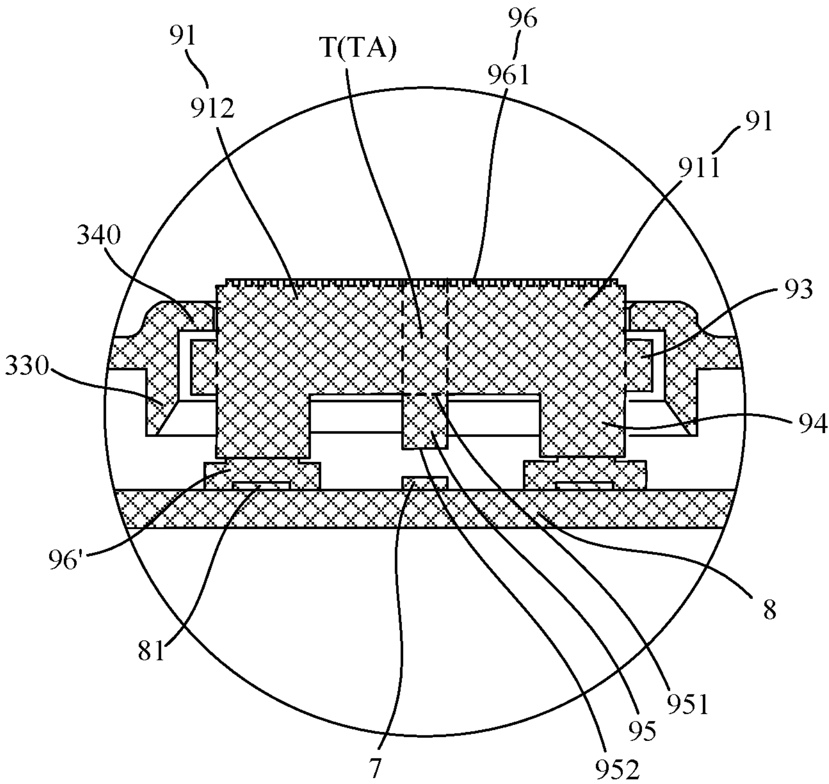
FIG. 17 is a sectional view taken along the B-B' section line in FIG. 9.

On this basis, referring to FIGS. 1, 9 and 10, the rearview mirror 1000 further includes button(s) 9. The button(s) 9 are disposed on a side of the first photosensitive sensor 7 and the switch(es) 81 away from the display device 100, and are connected to the rear housing 300 at the avoidance opening 320. As shown in FIG. 17, the button 9 has a light-transmitting region T that is a region covered by an orthographic projection of the first photosensitive sensor 7 on a surface of the button 9 away from the display device 100. In addition, the button 9 is configured to receive a user's pressing operation to trigger a respective switch 81. In this case, the button(s) 9 are disposed on the rear housing 300 of the rearview mirror 1000, which may reduce the bezel of the rearview mirror 1000 to realize a narrow bezel of the rearview mirror 1000. In addition, the button(s) 9 and the avoidance opening 320 required by the first photosensitive sensor 7 may be arranged in the centralized way. That is, the rear housing 300 does not need to be additionally provided with a plurality of openings, and has a simple structure.

It can be understood that there may be a plurality of switches 81, and each button 9 may correspond to one or more switches 81. A description will be made below in an example where the rearview mirror 1000 includes two switches 81 corresponding to the same button 9.

In some embodiments, as shown in FIG. 10, the two switches 81 and the first photosensitive sensor 7 are arranged in a first direction X, and the first photosensitive sensor 7 is located between the two switches 81. In this case, referring to FIG. 17, the button 9 includes a pressing portion 91, and the pressing portion 91 includes a first pressing sub-portion 911 and a second pressing sub-portion 912. The first pressing sub-portion 911 is configured to receive the user's pressing operation to trigger one of the two switches 81, and the second pressing sub-portion is configured to receive the user's pressing operation to trigger another one of the two switches 81.

In this case, the button 9 may trigger the two switches 81 in a rotating manner, and the first photosensitive sensor 7 may be disposed at a position between the two switches 81. That is, a partial space at a rotating fulcrum of the button 9 may be utilized to reduce a volume of the button 9, so as to make the structure more compact.

For example, as shown in FIGS. 10 and 18, the rear housing 300 includes a fixing portion 330 arranged around the avoidance opening 320. Two mounting shaft holes 331 are provided in the fixing portion 330. Axes Z' of the two mounting shaft holes 331 are substantially perpendicular to the first direction X, and are substantially parallel to the reference plane R. Here, the reference plane R is a plane where a surface of the display device 100 located on the display side D of the display device 100 (i.e., the surface of the mirror element 2 away from the display panel 4) is located.

Figure 11:
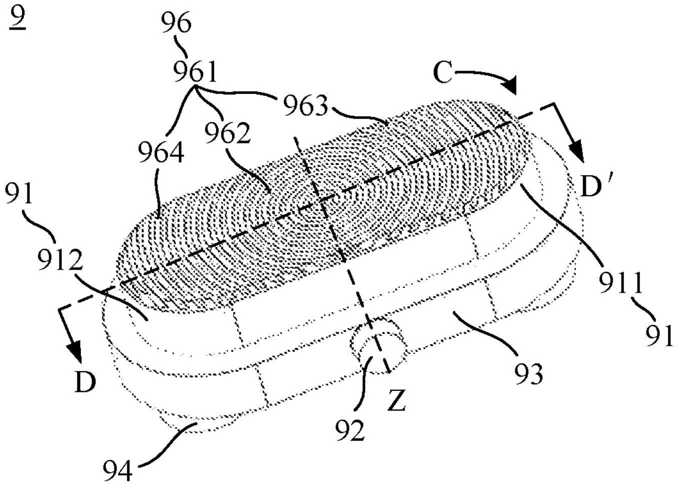
FIG. 11 is a structural diagram of a button, in accordance with some embodiments.

On this basis, referring to FIGS. 11 and 18, the button 9 further includes two rotation shafts 92 respectively located on two opposite sides of the pressing portion 91, and a straight line where an axis Z of each rotation shaft 92 is located passes between the first pressing sub-portion 911 and the second pressing sub-portion 912. Each rotation shaft 92 is correspondingly located in a mounting shaft hole 331.

In this case, the first pressing sub-portion 911 is pressed, and the button 9 rotates around the rotation shafts 92, so that the first pressing sub-portion 911 moves downward, the second pressing sub-portion 912 moves upward, and the first pressing sub-portion 911 triggers a corresponding switch. Similarly, the second pressing sub-portion 912 is pressed, and the button 9 rotates around the rotation shafts 92, so that the second pressing sub-portion 912 moves downward, the first pressing sub-portion 911 moves upward, and the second pressing sub-portion 912 triggers a corresponding switch 81.

In some embodiments, as shown in FIG. 17, the pressing portion 91 is spaced apart from the fixing portion 330 to avoid a frictional resistance between a side wall of the pressing portion 91 and the fixing portion 330 in a process of pressing the button 9.

On this basis, as shown in FIGS. 17 and 18, the rear housing 300 further includes a shielding portion 340 arranged around the button 9 and connected to an end portion of the fixing portion 330 away from the display device 100 (see FIG. 4). That is, the shielding portion 340 is connected to the end portion of the fixing portion 330 away from the driving board 8. The shielding portion 340 is located between the fixing portion 330 and the pressing portion 91. The shielding portion 340 is spaced apart from the pressing portion 91 to avoid a frictional resistance between the shielding portion 340 and the pressing portion 91.

Figure 12:
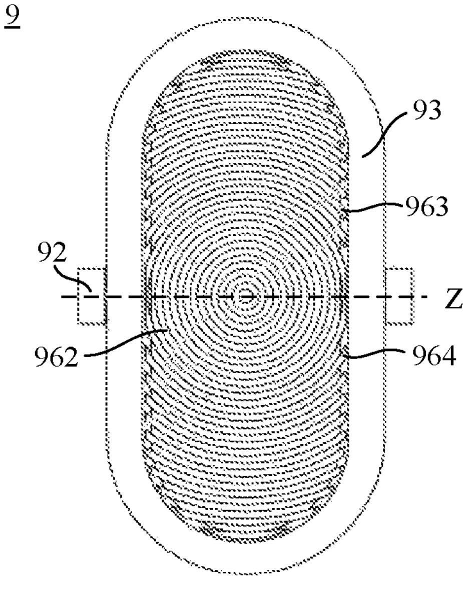
FIG. 12 is a top view of a button, in accordance with some embodiments.

In addition, as shown in FIGS. 11, 12 and 17, the button 9 further includes a blocking flange 93 arranged around the pressing portion 91 and located on a side of the shielding portion 340 proximate to the display device 100. The blocking flange 93 is located between the fixing portion 330 and the pressing portion 91. The blocking flange 93 is spaced apart from the shielding portion 340 to avoid an interference on the rotation of the button 9. The blocking flange 93 is spaced apart from the fixing portion 330 to avoid a frictional resistance between the blocking flange 93 and the fixing portion 330.

Here, the shielding portion 340 and the blocking flange 93 enable a curved long and narrow gap to be formed between the button 9 and the rear housing 300, which may reduce dust from the outside of the rearview mirror 1000 into the rear housing, so as to prolong the service life and improve the reliability.

Figure 13:
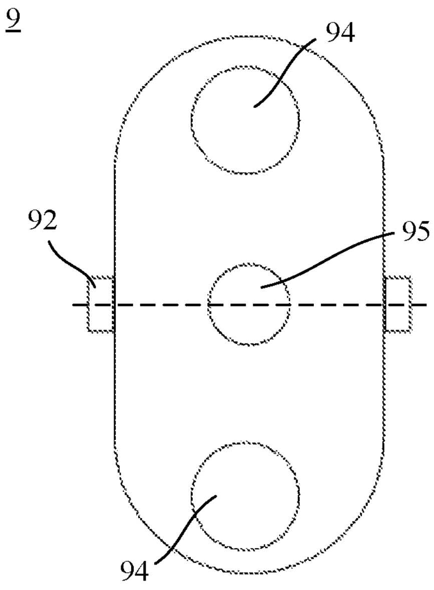
FIG. 13 is a bottom view of a button, in accordance with some embodiments.
Figure 15:
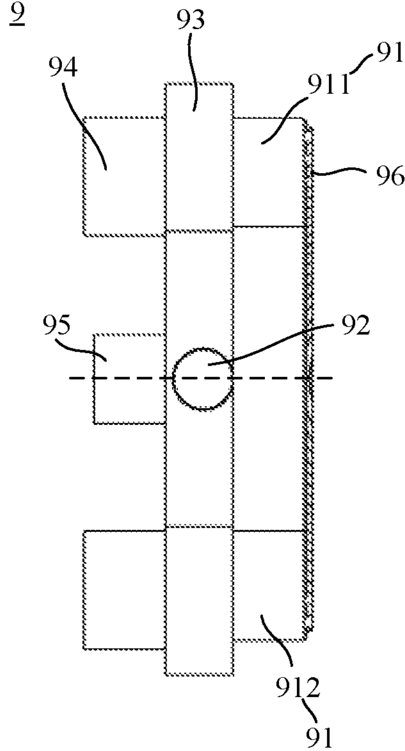
FIG. 15 is a front view of a button, in accordance with some embodiments.

It can be understood that in order to prevent the button 9 from interfering with the first photosensitive sensor 7 during rotation, as shown in FIGS. 17 and 18, the pressing portion 91 is spaced apart from the switches 81. On this basis, as shown in FIGS. 13, 15 and 17, the button 9 further includes two pressing pillars 94. The two pressing pillars 94 are disposed on a side of the pressing portion 91 proximate to the display device 100, and are connected to the two switches 81 in one-to-one correspondence.

It will be noted that the pressing pillar 94 may be a cylinder or a prism, which is not specifically limited here. In addition, the two pressing pillars 94 are respectively connected to the two switches 81 in a non-unique manner. For example, the two pressing pillars 94 may be respectively adhered to the two switches 81 in one-to-one correspondence.

Referring to FIGS. 10 and 17, the rearview mirror 1000 further includes elastic cushion(s) 96', and the elastic cushion 96' is disposed between the switch 81 and the button 9. For example, a side of the elastic cushion 96' covers the switch 81, and another side of the elastic cushion 96' is connected to the pressing pillar 94. In this way, the elastic cushion 96' not only may play a role of buffering to protect the switch 81, but also may generate an elastic restoring force after the deformation of the elastic cushion 96' itself to serve as power for resetting the button 9.

In some embodiments, as shown in FIGS. 13, 15 and 17, the button 9 further includes a light guide pillar 95 disposed on the side of the pressing portion 91 proximate to the display device 100 (see FIG. 4). The light guide pillar 95 includes a light incident surface 951 and a light exit surface 952. The light incident surface 951 is a surface of the light guide pillar 95 proximate to the pressing portion 91, and the light exit surface 952 is a surface of the light guide pillar 95 away from the pressing portion 91. The light guide pillar 95 is configured such that light entering from the light incident surface is totally reflected therein, and exits from the light exit surface to the first photosensitive sensor 7, so as to reduce escape of the light during propagation to improve an accuracy of the light intensity of the ambient light sensed by the first photosensitive sensor 7. An orthographic projection of the light guide pillar 95 on the reference plane R is at least partially overlapped with an orthographic projection of the first photosensitive sensor 7 on the reference plane R.

It will be noted that the light guide pillar 95 may be a cylinder or a prism, which is not specifically limited here. In addition, an axial length of the light guide pillar 95 is less than an axial length of the pressing pillar 93, and the light guide pillar 95 is spaced apart from the first photosensitive sensor 7.

For example, referring to FIG. 18, the first photosensitive sensor 7 includes a base 71 and a photosensitive chip 72. The photosensitive chip 72 is disposed in the base 71, and a light-transmitting hole 711 is provided in a portion of the base 71 located on a photosensitive side P of the photosensitive chip 72. The photosensitive chip 72 is configured to sense the light intensity of the ambient light located on the non-display side N of the display device 100 through the light-transmitting hole 711. The orthographic projection of the light guide pillar 95 on the reference plane R is at least partially overlapped with an orthogonal projection of the light-transmitting hole 71 on the reference plane R. For example, the orthographic projection of the light guide pillar 95 on the reference plane R covers the orthogonal projection of the light-transmitting hole 71 on the reference plane R.

Figure 14:
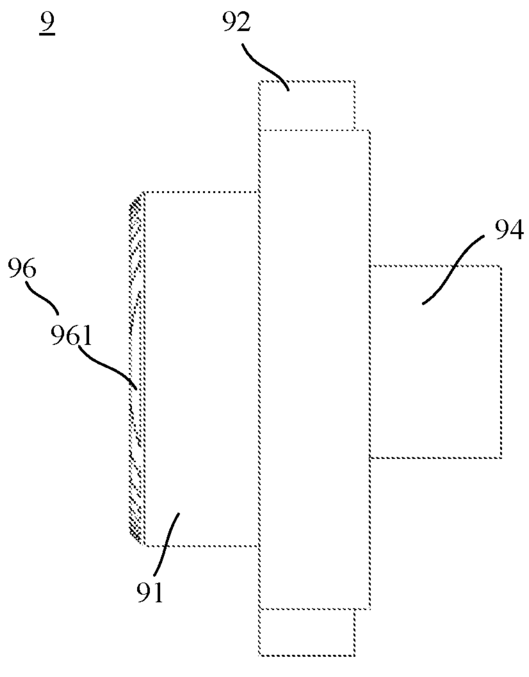
FIG. 14 is a side view of a button, in accordance with some embodiments.

In some embodiments, as shown in FIGS. 11, 12 and 14, the button 9 may further include a light gathering structure 96 disposed on a side of the pressing portion 91 away from the display device 100 (see FIG. 4). The light gathering structure 96 includes a plurality of protrusions 961 spaced apart from each other, and each protrusion 961 extends along a circumferential direction C of the pressing portion 91. Here, the light gathering structure 96 is configured to gather ambient light received by a surface of the pressing portion 91 away from the display device 100 (see FIG. 4) to a target region TA, so as to increase the ambient light that is able to be sensed by the first photosensitive sensor 7. The target region TA is located within the light-transmitting region T or coincides with the light-transmitting region T.

Figure 16:
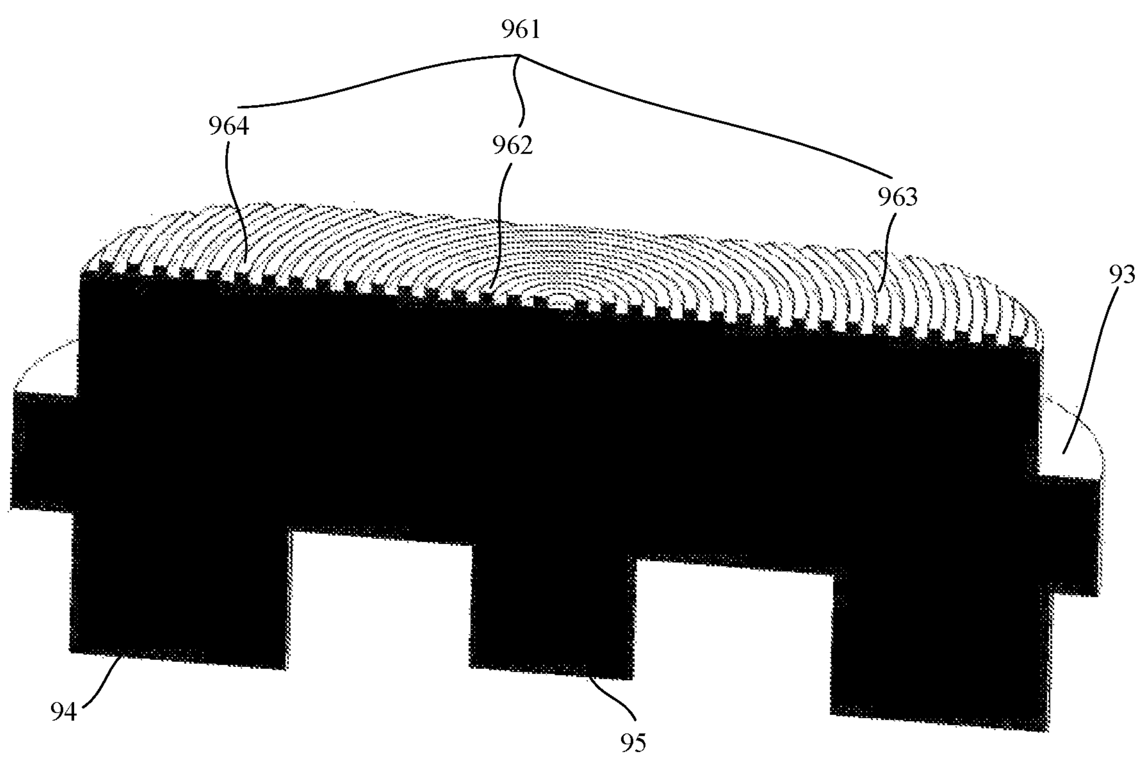
FIG. 16 is a sectional view taken along the D-D' section line in FIG. 11.

For example, as shown in FIGS. 11, 12 and 16, the plurality of protrusions 961 include annular protrusions 962, and first arc-shaped protrusions 963 and second arc-shaped protrusions 964 that are located respectively on two opposite sides of the annular protrusions 962. The annular protrusion 962 surrounds a center of the target region, the first arc-shaped protrusion 963 is located at the first pressing sub-portion 911, and the second arc-shaped protrusion 964 is located at the second pressing sub-portion 912. Moreover, a center of a circle, on which the first arc-shaped protrusion 963 is located, is located on a side of the first arc-shaped protrusion 963 proximate to the center of the target region, and a center of a circle, on which the second arc-shaped protrusion 964 is located, is located on a side of the second arc-shaped protrusion 964 proximate to the center of the target region.

In this way, the ambient light received by the surface of the pressing portion 91 away from the display device 100 may be gathered to the target region, so as to increase the ambient light that is able to be sensed by the first photosensitive sensor 7. Moreover, the surface of the pressing portion 91 is uneven, which may improve a frictional force between the user and the pressing portion 91 during pressing, thereby improving the user experience.

In addition, distances between the plurality of protrusions 961 may be same or different, heights of the plurality of protrusions 961 may be same or different, wall thicknesses of the plurality of protrusions 961 may be same or different, and included angles between side walls of the plurality of protrusions 961 and the reference plane R may be same or different. Here, the included angles between the side walls of the plurality of protrusions 961 and the reference plane R are included angles formed by the side walls of the protrusions and a surface of the pressing portion 91 uncovered by the protrusions.

For example, the distances between the plurality of protrusions 961 are same. For example, from a side of the button 9 to the target region, the distances between the plurality of protrusions 961 are gradually decreased. That is, the closer to the target region, the larger the density of the plurality of protrusions 961. For example, from a side of the button 9 to the target region, the distances between the plurality of protrusions 961 are gradually increased. That is, the closer to the target region, the smaller the density of the plurality of protrusions 961.

It will be noted that the distance between the plurality of protrusions 961 is in a range of 0.25 mm to 0.75 mm, inclusive. For example, the distance between the plurality of protrusions 961 is 0.25 mm, 0.5 mm or 0.75 mm.

For example, the wall thicknesses of the plurality of protrusions 961 are same. For example, from a side of the button 9 to the target region, the wall thicknesses of the plurality of protrusions 961 are gradually decreased. That is, the closer to the target region, the smaller the wall thickness of the protrusion 961. For example, from a side of the button 9 to the target region, the wall thicknesses of the plurality of protrusions 961 are gradually increased. That is, the closer to the target region, the larger the wall thickness of the protrusion 961.

It will be noted that the wall thickness of the protrusion 961 is in a range of 0.2 mm to 0.3 mm, inclusive. For example, the wall thickness of the protrusion 961 is 0.2 mm, 0.25 mm or 0.3 mm.

For example, the heights of the plurality of protrusions 961 are same. For example, from a side of the button 9 to the target region, the heights of the plurality of protrusions 961 are gradually decreased. That is, the closer to the target region, the smaller the height of the protrusion 961. For example, from a side of the button 9 to the target region, the heights of the plurality of protrusions 961 are gradually increased. That is, the closer to the target region, the larger the height of the protrusion 961.

It will be noted that the height of the protrusion 961 is in a range of 0.1 mm to 0.3 mm, inclusive. For example, the height of the protrusion 961 is 0.1 mm, 0.2 mm or 0.3 mm.

For example, the included angles between the side walls of the protrusions 961 and the reference plane are same. For example, from a side of the button 9 to the target region, the included angles between the side walls of the plurality of protrusions 961 and the reference plane are gradually decreased. That is, the closer to the target region, the smaller the inclination angle of the protrusion 961. For example, from a side of the button 9 to the target region, the included angles between the side walls of the plurality of protrusions 961 and the reference plane are gradually increased. That is, the closer to the target region, the larger the inclination angle of the protrusion 961.

It will be noted that the included angle between the side wall of the protrusion 961 and the surface of the pressing portion 91 away from the display device 100 is in a range of 85° to 120°, inclusive. For example, the included angle between the side wall of the protrusion 961 and the surface of the pressing portion 91 away from the display device 100 is 85°, 90°, 100° or 120°.

In some embodiments, referring to FIG. 11, the button 9 may be of an integral structure. That is, the portions (e.g., the pressing portion 91, the rotation shafts 92 and the blocking flange 93) included in the button 9 are integrally formed. In addition, the button 9 may be transparent as a whole. Here, the term "transparent" means that a light transmittance of the button 9 is greater than or equal to 85%. For example, a material of the button 9 includes polycarbonate (PC) and/or polymethyl methacrylate (PMMA), which is not limited thereto in the embodiments of the present disclosure.

Some embodiments of the present disclosure further provide a control method of a rearview mirror 1000, and the rearview mirror 1000 is the rearview mirror 1000 in any one of the above embodiments.

Figure 22:
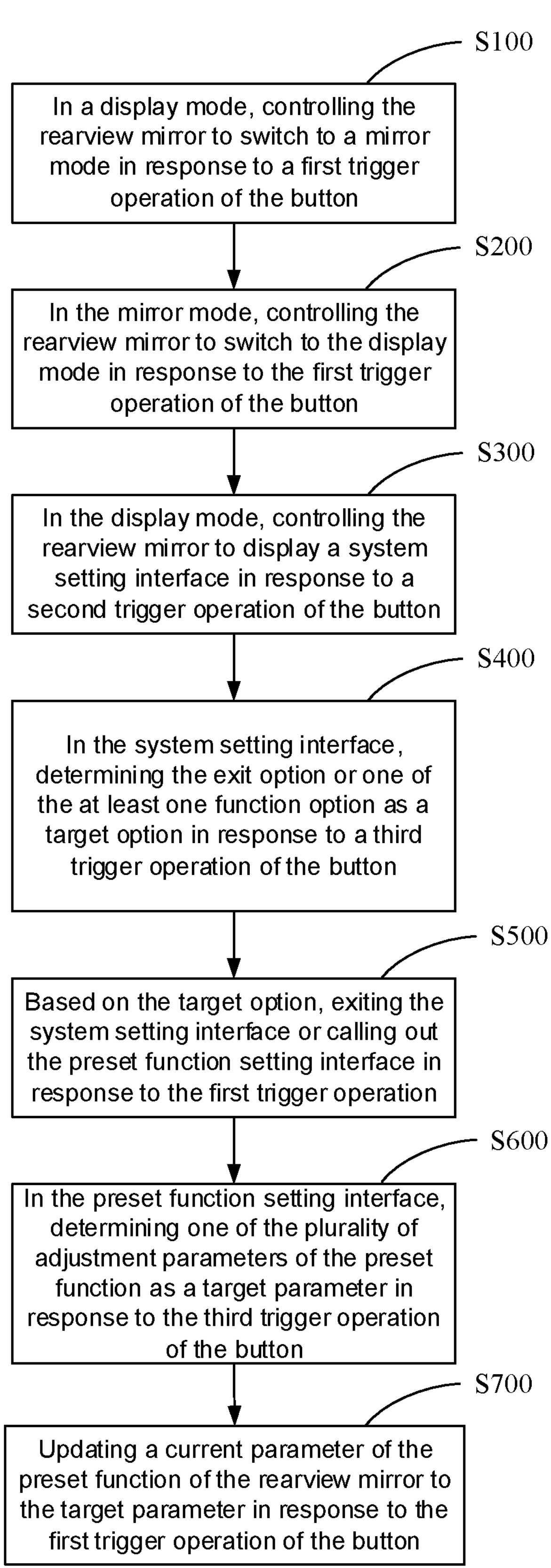
FIGS. 22 and 23 are flow diagrams of a control method of a rearview mirror, in accordance with some embodiments.

Referring to FIGS. 1 and 22, the control method of the rearview mirror 1000 includes S100 and S200.

In S100, in the display mode, the rearview mirror 1000 is controlled to switch to the mirror mode in response to a first trigger operation of the button 9.

In the above step, referring to FIG. 17, in response to the first trigger operation of the button 9, the switch 81 generates and transmits a first electrical signal to a control device. After the control device receives the first electrical signal from the switch 81, the control device generates a first control instruction in the display mode, so as to control the display panel 4 to stop emitting light (i.e., stop displaying) and control the mirror element 2 to switch from the high transmission state to the high reflection state. That is, the rearview mirror 1000 is controlled to switch to the mirror mode. The control device may be integrated inside the rearview mirror 1000.

The first trigger operation may be a click, a long time pressing, or a continuous click. For example, referring to FIGS. 11 and 17, in a case where the button 9 includes the pressing portion 91, and the pressing portion 91 includes the first pressing sub-portion 911 and the second pressing sub-portion 912, the first trigger operation may be the click. For example, the first pressing sub-portion 911 is pressed, and a pressing duration is less than or equal to a fourth preset duration. Here, the pressing duration is a duration of a continuous pressing. That is, when the duration of the continuous pressing is less than or equal to the fourth preset duration, the operation is determined as the click, which may also be referred to as a short time pressing.

It will be noted that the fourth preset duration may be set according to an actual situation. For example, the fourth preset duration is in a range of 1 s to 2 s, inclusive. For example, the fourth preset duration is 1 s, 1.5 s or 2 s, which is not limited thereto.

In S200, in the mirror mode, the rearview mirror 1000 is controlled to switch to the display mode in response to the first trigger operation of the button 9.

In the above step, referring to FIG. 17, in response to the first trigger operation of the button 9, the switch 81 generates and transmits the first electrical signal to the control device. After the control device receives the first electrical signal from the switch, the control device generates a second control instruction in the mirror mode, so as to control the display panel 4 to emit light (i.e., to display) and control the mirror element 2 to switch from the high reflection state to the high transmission state. That is, the rearview mirror 1000 is controlled to switch to the display mode.

It will be noted that the first trigger operation may refer to S100, and details will not be repeated here.

In some embodiments, referring to FIG. 22, the control method further includes S300 to S500.

In S300, in the display mode, the rearview mirror 1000 is controlled to display a system setting interface in response to a second trigger operation of the button 9.

In the above step, referring to FIG. 17, in response to the second trigger operation of the button 9, the switch 81 generates and transmits a second electrical signal to the control device. After the control device receives the second electrical signal from the switch 81, the control device generates a third control instruction in the display mode, so as to control the display panel 4 of the rearview mirror 1000 to display the system setting interface. The system setting interface may be shown as an example in FIG. 19.

The second trigger operation may be a click, a long time pressing, or a continuous click.

For example, referring to FIGS. 11 and 17, in the case where the button 9 includes the pressing portion 91, and the pressing portion 91 includes the first pressing sub-portion 911 and the second pressing sub-portion 912, the second trigger operation may be the long time pressing. For example, the first pressing sub-portion 911 or the second pressing sub-portion 912 is pressed, and a pressing duration is greater than or equal to a first preset duration and less than or equal to a second preset duration.

It will be noted that the first preset duration and the second preset duration may be set according to an actual situation. For example, the first preset duration is in a range of 2 s to 3 s, inclusive, and the second preset duration is in a range of 4 s to 7 s, inclusive. For example, the first preset duration is 2 s, and the second preset duration is 5 s, which is not limited thereto.

For example, referring to FIGS. 11 and 17, in the case where the button 9 includes the pressing portion 91, and the pressing portion 91 includes the first pressing sub-portion 911 and the second pressing sub-portion 912, the second trigger operation may be the continuous click. For example, the first pressing sub-portion 911 or the second pressing sub-portion 912 is pressed twice consecutively. A duration of each pressing is less than or equal to a sixth preset duration, and a time interval between the two pressings is less than a seventh preset duration.

It will be noted that the sixth preset duration and the seventh preset duration may be set according to an actual situation. The sixth preset duration may be the same as or different from the fourth preset duration, which is not limited.

In addition, the system setting interface includes an exit option and at least one function option. The exit option is configured to exit the system setting interface in response to the first trigger operation. Each function option corresponds to a preset function setting interface. The function option is configured to call out a preset function setting interface corresponding to the function option in response to the first trigger operation. The preset function setting interface includes a plurality of adjustment parameters of a preset function.

Here, the at least one function option may include at least one of a brightness adjustment option, a viewing angle adjustment option and a field of view adjustment option. For example, the at least one function option includes the brightness adjustment option, the viewing angle adjustment option and the field of view adjustment option.

The brightness adjustment option is configured to call out a brightness setting interface in response to the first trigger operation. The brightness setting interface includes a plurality of adjustment parameters of brightness. For example, the brightness setting interface includes 10 brightness levels, i.e., 10 adjustment parameters, which is not limited thereto.

Positions, shapes and sizes of the plurality of adjustment parameters of the brightness in the brightness setting interface in the embodiments of the present disclosure may be shown as an example in FIG. 20; or the plurality of adjustment parameters of the brightness may be located at other preset positions in the brightness setting interface, or displayed in other shapes and sizes in the brightness setting interface, which is not limited.

The viewing angle adjustment option is configured to call out a viewing angle setting interface in response to the first trigger operation. The viewing angle setting interface includes a plurality of adjustment parameters of viewing angle. For example, the viewing angle setting interface includes 7 brightness levels, i.e., 7 adjustment parameters, which is not limited thereto.

Figure 21:
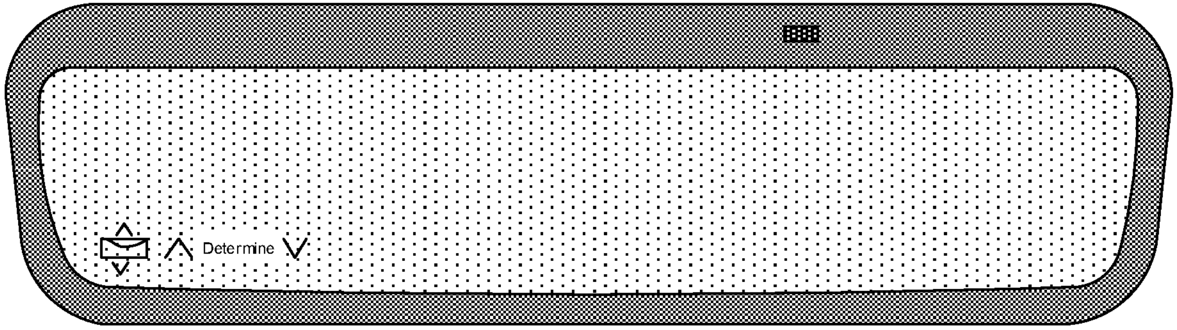
FIG. 21 is a diagram showing a viewing angle setting interface or a field of view setting interface of a rearview mirror, in accordance with some embodiments.

Positions, shapes and sizes of the plurality of adjustment parameters of the viewing angle in the viewing angle setting interface in the embodiments of the present disclosure may be shown as an example in FIG. 21; or the plurality of adjustment parameters of the viewing angle may be located at other preset positions in the viewing angle setting interface, or displayed in other shapes and sizes in the viewing angle setting interface, which is not limited.

The field of view adjustment option is configured to call out a field of view setting interface in response to the first trigger operation. The field of view setting interface includes a plurality of adjustment parameters of field of view. For example, the field of view setting interface includes 3 brightness levels, i.e., 3 adjustment parameters, which is not limited thereto.

Positions, shapes and sizes of the plurality of adjustment parameters of the field of view in the field of view setting interface in the embodiments of the present disclosure may be shown as the example in FIG. 21; or the plurality of adjustment parameters of the field of view may be located at other preset positions in the field of view setting interface, or displayed in other shapes and sizes in the field of view setting interface, which is not limited.

In S400, in the system setting interface, the exit option or one of the at least one function option is determined as a target option in response to a third trigger operation of the button 9.

In the above step, referring to FIG. 17, in response to the third trigger operation of the button 9, the switch 81 generates and transmits a third electrical signal to the control device. After the control device receives the third electrical signal from the switch, the control device generates a fourth control instruction in the system setting interface, so as to determine the exit option or the one of the at least one function option as the target option. For example, a selection cursor moves to the exit option or the one of the at least one function option, and an option corresponding to the selection cursor is the target option.

The third trigger operation may be a click, a long time pressing, or a continuous click. For example, referring to FIGS. 11 and 17, in the case where the button 9 includes the pressing portion 91, and the pressing portion 91 includes the first pressing sub-portion 911 and the second pressing sub-portion 912, the third trigger operation may be the click. For example, the second pressing sub-portion is pressed, and a pressing duration is less than or equal to a third preset duration. Here, the pressing duration is a duration of a continuous pressing. That is, when the duration of the continuous pressing is less than or equal to the third preset duration, the operation is determined as the click, which may also be referred to as a short time pressing.

It will be noted that the third preset duration may be set according to an actual situation, and may be the same as or different from the fourth preset duration. For example, the third preset duration is in a range of 1 s to 2 s, inclusive. For example, the third preset duration is 1 s, 1.5 s or 2 s, which is not limited thereto.

In S500, based on the target option, the system setting interface is exited or the preset function setting interface is called out in response to the first trigger operation.

In the above step, referring to FIG. 17, in response to the first trigger operation of the button 9, the switch 81 generates and transmits the first electrical signal to the control device. After the control device receives the first electrical signal from the switch, in the system setting interface, the control device generates a fifth control instruction to perform a function corresponding to the target option.

For example, in a case where the target option is the exit option, the rearview mirror 1000 is controlled to exit the system setting interface.

For example, in a case where the target option is the one function option, the rearview mirror 1000 is controlled to call out a preset function setting interface corresponding to the function option. For example, in a case where the target option is the brightness adjustment option, the rearview mirror 1000 is controlled to call out the brightness setting interface. For another example, in a case where the target option is the field of view adjustment option, the rearview mirror 1000 is controlled to call out the field of view setting interface. For yet another example, in a case where the target option is the viewing angle adjustment option, the rearview mirror 1000 is controlled to call out the viewing angle setting interface.

In some embodiments, as shown in FIG. 22, the control method further includes S600 and S700.

In S600, in the preset function setting interface, one of the plurality of adjustment parameters of the preset function is determined as a target parameter in response to the third trigger operation of the button 9.

In the above step, referring to FIG. 17, in response to the third trigger operation of the button 9, the switch 81 generates and transmits the third electrical signal to the control device. After the control device receives the third electrical signal from the switch, the control device generates a sixth control instruction in the preset function setting interface, so as to determine the one of the plurality of adjustment parameters of the preset function as the target parameter. For example, the selection cursor moves to the one of the plurality of adjustment parameters of the preset function, and an adjustment parameter corresponding to the selection cursor is the target parameter.

In S700, a current parameter of the preset function of the rearview mirror is updated to the target parameter in response to the first trigger operation of the button 9.

In the above step, referring to FIG. 17, in response to the first trigger operation of the button 9, the switch 81 generates and transmits the first electrical signal to the control device. After the control device receives the first electrical signal from the switch, the control device generates a seventh control instruction in the preset function setting interface, so as to update the current parameter of the preset function of the rearview mirror 1000 to the target parameter.

Figure 23:
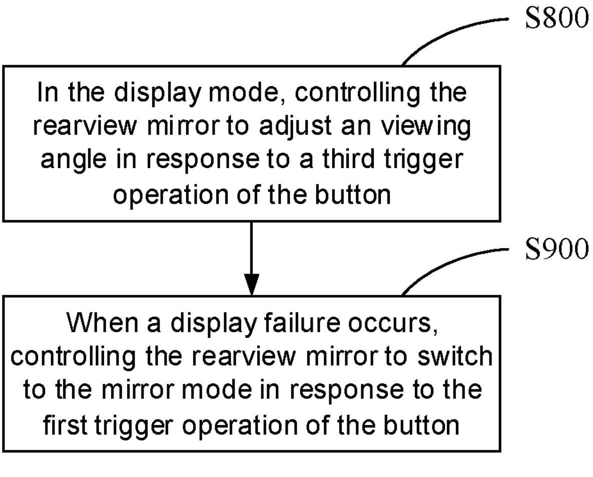

In some embodiments, as shown in FIG. 23, the control method further includes S800.

In S800, in the display mode, the rearview mirror 1000 is controlled to adjust the viewing angle in response to the third trigger operation of the button 9.

In the above step, referring to FIG. 17, in response to the third trigger operation of the button 9, the switch 81 generates and transmits the third electrical signal to the control device. After the control device receives the third electrical signal from the switch, the control device generates an eighth control instruction in the display mode, so as to control the rearview mirror 1000 to adjust the viewing angle. That is, in the display mode, through the third trigger operation, the user may directly enter the viewing angle setting interface without going through the system setting interface, and the operation is simple and convenient.

In some embodiments, as shown in FIG. 23, the control method further includes S900.

In S900, when a display failure occurs, the rearview mirror 1000 is controlled to switch to the mirror mode in response to the first trigger operation of the button 9.

In the above step, referring to FIG. 17, in response to the first trigger operation of the button 9, the switch 81 generates and transmits the first electrical signal to the control device. After the control device receives the first electrical signal from the switch, the control device generates a ninth control instruction when the display failure occurs, so as to control the display panel 4 to stop emitting light (i.e., stop displaying) and control the mirror element 2 to switch from the high transmission state to the high reflection state. That is, the rearview mirror 1000 is controlled to switch to the mirror mode. The control device may be integrated inside the rearview mirror 1000.

It will be noted that when a camera fails, the control device generates a display failure control instruction, so as to control the rearview mirror 1000 to display a blue screen, and to control the rearview mirror 1000 to display a black screen after a fifth preset duration and store a failure image before the camera fails. Here, the camera may be a component of the vehicle electrically connected to the control device of the rearview mirror.

Figure 24:
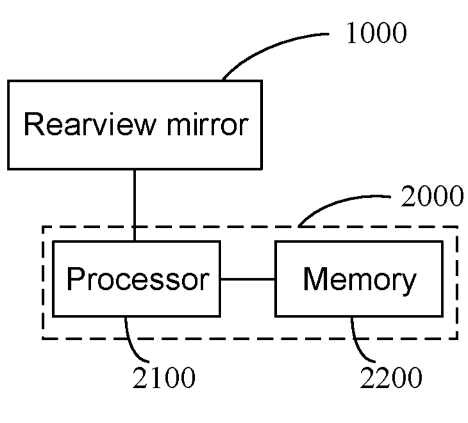
FIG. 24 is a structural diagram of a rearview mirror system, in accordance with some embodiments.

Some embodiments of the present disclosure further provide a rearview mirror system. As shown in FIG. 24, the rearview mirror system 10 includes the rearview mirror 1000 in any one of the above embodiments and the control device 2000. The control device 2000 includes a processor 2100 and a memory 2200 storing computer program instructions. When run on the processor 2100, the computer program instructions cause the processor 2100 to execute one or more steps of the control method of the rearview mirror 1000 in any one of the above embodiments. For example, the processor 2100 may be a processor on a main board of the display device of the rearview mirror. In addition, the control device 2000 may be integrated inside the rearview mirror 1000, which is not limited.

Some embodiments of the present disclosure further provide a computer-readable storage medium (e.g., non-transitory computer-readable storage medium). The computer-readable storage medium stores computer program instructions. When run on a computer (e.g., the display device), the computer program instructions cause the computer to execute one or more steps of the control method of the rearview mirror in any one of the above embodiments.

For example, the computer-readable storage medium may include, but is not limited to, a magnetic storage device (e.g., a hard disk, a floppy disk or a magnetic tape), an optical disk (e.g., a compact disk (CD), a digital versatile disk (DVD)), a smart card or a flash memory device (e.g., an erasable programmable read-only memory (EPROM), a card, a stick or a key driver). The various kinds of computer-readable storage media described in the present disclosure may represent one or more devices and/or other machine-readable storage media for storing information. The term "machine-readable storage media" may include, but is not limited to, wireless channels and various kinds of other media capable of storing, containing and/or carrying instructions and/or data.

Some embodiments of the present disclosure further provide a computer program. When executed on a computer (e.g., the rearview mirror), the computer program causes the computer to execute the control method of the rearview mirror in the above embodiments.

Beneficial effects of each of the computer-readable storage medium and the computer program are the same as the beneficial effects of the control method of the rearview mirror in some of the above embodiments, and details will not be repeated here.

The foregoing descriptions are merely specific implementations of the present disclosure. However, the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A rearview mirror, comprising:

a display device;

at least one switch disposed on a non-display side of the display device;

a photosensitive sensor disposed on the non-display side of the display device; wherein the photosensitive sensor is configured to sense a light intensity of ambient light located on the non-display side of the display device;

a rear housing disposed on the non-display side of the display device; wherein an avoidance opening is disposed in the rear housing, and exposes the first photosensitive sensor and the at least one switch; and a button disposed on a side of the photosensitive sensor and the at least one switch away from the display device and connected to the rear housing at the avoidance opening; wherein the button has a light-transmitting region that is a region covered by an orthographic projection of the first photosensitive sensor on a surface of the button away from the display device; the button is configured to receive a pressing operation to trigger a respective switch in the at least one switch.

2. The rearview mirror according to claim 1, wherein the at least one switch includes two switches; wherein the two switches and the first photosensitive sensor are arranged in a first direction, and the first photosensitive sensor is located between the two switches; and the button includes:

a pressing portion including a first pressing sub-portion and a second pressing sub-portion; wherein the first pressing sub-portion is configured to receive the pressing operation to trigger one of the two switches; and the second pressing sub-portion is configured to receive the pressing operation to trigger another one of the two switches.

3. The rearview mirror according to claim 2, wherein the rear housing includes:

a fixing portion arranged around the avoidance opening; wherein two mounting shaft holes are disposed in the fixing portion; axes of the two mounting shaft holes are perpendicular to the first direction, and are parallel to a reference plane; the reference plane is a plane where a surface of the display device located on a display side of the display device is located; and the button further includes:

two rotation shafts respectively located on two opposite sides of the pressing portion; wherein a straight line where an axis of each rotation shaft is located passes between the first pressing sub-portion and the second pressing sub-portion; each rotation shaft is correspondingly located in a mounting shaft hole in the two mounting shaft holes.

4. The rearview mirror according to claim 3, wherein the pressing portion is spaced apart from the fixing portion; the rear housing further includes:

a shielding portion arranged around the button and connected to an end portion of the fixing portion away from the display device; and the button further includes:

a blocking flange arranged around the pressing portion and located on a side of the shielding portion proximate to the display device.

5. The rearview mirror according to claim 2, wherein the pressing portion is spaced apart from the switches; the button further includes:

two pressing pillars disposed on a side of the pressing portion proximate to the display device and connected to the two switches in one-to-one correspondence.

6. The rearview mirror according to claim 2, wherein the pressing portion is spaced apart from the switches; the button further includes:

a light guide pillar disposed on a side of the pressing portion proximate to the display device; wherein the light guide pillar includes a light incident surface and a light exit surface; the light incident surface is a surface of the light guide pillar proximate to the pressing portion, and is located in the light-transmitting region of the button; the light exit surface is a surface of the light guide pillar away from the pressing portion; the light guide pillar is configured such that light entering from the light incident surface is totally reflected in the light guide pillar, and exits from the light exit surface to the first-photosensitive sensor.

7. The rearview mirror according to claim 6, wherein the first photosensitive sensor includes a base and a photosensitive chip disposed in the base, and a light-transmitting hole is disposed in a portion of the base located on a photosensitive side of the photosensitive chip; the photosensitive chip is configured to sense the light intensity of the ambient light located on the non-display side of the display device through the light-transmitting hole; and an orthographic projection of the light guide pillar on a reference plane is at least partially overlapped with an orthogonal projection of the light-transmitting hole on the reference plane; the reference plane is a plane where a surface of the display device located on a display side of the display device is located.

8. The rearview mirror according to claim 2, wherein the button further includes:

a light gathering structure disposed on a side of the pressing portion away from the display device; wherein the light gathering structure includes a plurality of protrusions spaced apart from each other, and each protrusion extends along a circumferential direction of the pressing portion; the light gathering structure is configured to gather ambient light incident on a surface of the pressing portion away from the display device to a target region, and the target region is located within the light-transmitting region or coincides with the light-transmitting region.

9. The rearview mirror according to claim 8, wherein the plurality of protrusions include annular protrusions, and first arc-shaped protrusions and second arc-shaped protrusions that are located respectively on two opposite sides of the annular protrusions; wherein the annular protrusions each surround a center of the target region, the first arc-shaped protrusions are located at the first pressing sub-portion, and the second arc-shaped protrusions are located at the second pressing sub-portion; and a center of a circle, on which a first arc-shaped protrusion in the first arc-shaped protrusions is located, is located on a side of the first arc-shaped protrusion proximate to the center of the target region, and a center of a circle, on which a second arc-shaped protrusion in the second arc-shaped protrusions is located, is located on a side of the second arc-shaped protrusion proximate to the center of the target region.

10. The rearview mirror according to claim 1, wherein the button is of an integral structure, and is transparent.

11. The rearview mirror according to claim 1, further comprising:

at least one elastic cushion(s) each disposed between a switch in the at least one switch and the button.

12. The rearview mirror according to claim 1, wherein the display device includes:

a display panel;

a mirror element stacked on the display panel and disposed on a light exit side of the display panel; wherein the mirror element is configured to reflect at least part of ambient light incident on the rearview mirror; and a driving board electrically connected to the display panel and the mirror element; wherein the driving board is disposed on a side of the display panel away from the mirror element, and the at least one switch is disposed on a surface of the driving board away from the mirror element.

13. A control method of a rearview mirror that is the rearview mirror according to claim 1, comprising:

in a display mode, controlling the rearview mirror to switch to a mirror mode in response to a first trigger operation of the button; and in the mirror mode, controlling the rearview mirror to switch to the display mode in response to the first trigger operation of the button.

14. The control method according to claim 13, further comprising:

in the display mode, controlling the rearview mirror to adjust an viewing angle in response to a third trigger operation of the button; and/or when a display failure occurs, controlling the rearview mirror to switch to the mirror mode in response to the first trigger operation of the button.

15. The control method according to claim 13, wherein the button includes a pressing portion, and the pressing portion includes a first pressing sub-portion and a second pressing sub-portion; wherein the first trigger operation is to press the first pressing sub-portion, and a pressing duration is less than or equal to a fourth preset duration; or the control method further comprises; in the display mode, controlling the rearview mirror to display a system setting interface in response to a second trigger operation of the button, wherein the system setting interface includes an exit option and at least one function option, the exit option is configured to exit the system setting interface in response to the first trigger operation, each function option corresponds to a preset function setting interface, the function option is configured to call out the preset function setting interface corresponding to the function option in response to the first trigger operation, and the preset function setting interface includes a plurality of adjustment parameters of a preset function; in the system setting interface, determining the exit option or one of the at least one function option as a target option in response to a third trigger operation of the button; and based on the target option, exiting the system setting interface or calling out the preset function setting interface in response to the first trigger operation; and the first trigger operation is to press the first pressing sub-portion, and the pressing duration is less than or equal to the fourth preset duration; the second trigger operation is to press the first pressing sub-portion or the second pressing sub-portion, and a pressing duration is greater than or equal to a first preset duration and less than or equal to a second preset duration; the third trigger operation is to press the second pressing sub-portion, and a pressing duration is less than or equal to a third preset duration.

16. A non-transitory computer-readable storage medium storing computer program instructions; wherein when run on a computer, the computer program instructions cause the computer to execute one or more the control method of the rearview mirror according to claim 13.

17. The control method according to claim 13, further comprising:

in the display mode, controlling the rearview mirror to display a system setting interface in response to a second trigger operation of the button; wherein the system setting interface includes an exit option and at least one function option; the exit option is configured to exit the system setting interface in response to the first trigger operation; each function option corresponds to a preset function setting interface, and the function option is configured to call out the preset function setting interface corresponding to the function option in response to the first trigger operation; the preset function setting interface includes a plurality of adjustment parameters of a preset function;

in the system setting interface, determining the exit option or one of the at least one function option as a target option in response to a third trigger operation of the button; and based on the target option, exiting the system setting interface or calling out the preset function setting interface in response to the first trigger operation.

18. The control method according to claim 17, further comprising:

in the preset function setting interface, determining one of the plurality of adjustment parameters of the preset function as a target parameter in response to the third trigger operation of the button; and updating a current parameter of the preset function of the rearview mirror to the target parameter in response to the first trigger operation of the button.

19. The control method according to claim 14, wherein the at least one function option includes at least one of a brightness adjustment option, a viewing angle adjustment option and a field of view adjustment option; wherein the brightness adjustment option is configured to call out a brightness setting interface in response to the first trigger operation; the brightness setting interface includes a plurality of adjustment parameters of brightness;

the viewing angle adjustment option is configured to call out a viewing angle setting interface in response to the first trigger operation; the viewing angle setting interface includes a plurality of adjustment parameters of viewing angle; and the field of view adjustment option is configured to call out a field of view setting interface in response to the first trigger operation; the field of view setting interface includes a plurality of adjustment parameters of field of view.

20. A rearview mirror system, comprising the rearview mirror according to claim 1 and a control device; wherein the control device includes a processor and a memory storing computer program instructions; when run on the processor, the computer program instructions cause the processor to execute a control method of the rearview mirror; the control method includes:

in a display mode, controlling the rearview mirror to switch to a mirror mode in response to a first trigger operation of the button; and in the mirror mode, controlling the rearview mirror to switch to the display mode in response to the first trigger operation of the button.

* * * * *